US011587571B2

(12) United States Patent
Choi

(10) Patent No.: US 11,587,571 B2
(45) Date of Patent: Feb. 21, 2023

(54) ELECTRONIC APPARATUS AND CONTROL METHOD THEREOF

(71) Applicant: SAMSUNG ELECTRONICS CO., LTD., Suwon-si (KR)

(72) Inventor: Chanhee Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 118 days.

(21) Appl. No.: 17/010,370

(22) Filed: Sep. 2, 2020

(65) Prior Publication Data

US 2021/0065718 A1     Mar. 4, 2021

(30) Foreign Application Priority Data

Sep. 3, 2019    (KR) .................. 10-2019-0109157

(51) Int. Cl.
     *G10L 15/22*      (2006.01)
     *G10L 15/32*      (2013.01)
     *G10L 15/30*      (2013.01)

(52) U.S. Cl.
     CPC .............. *G10L 15/32* (2013.01); *G10L 15/22* (2013.01); *G10L 15/30* (2013.01); *G10L 2015/223* (2013.01)

(58) Field of Classification Search
     CPC .......... G10L 15/32; G10L 15/22; G10L 15/30
     See application file for complete search history.

(56) References Cited

U.S. PATENT DOCUMENTS

| 9,589,561 | B2 | 3/2017 | Choi et al. |
| 2006/0009980 | A1* | 1/2006 | Burke ............. G10L 15/30 704/E15.047 |
| 2014/0337032 | A1* | 11/2014 | Aleksic ........... G10L 15/32 704/257 |
| 2015/0088506 | A1 | 3/2015 | Obuchi et al. |
| 2016/0063995 | A1 | 3/2016 | Choi et al. |
| 2019/0051295 | A1 | 2/2019 | Voigt |

FOREIGN PATENT DOCUMENTS

DE    10 2017 213 946 A1    2/2019

OTHER PUBLICATIONS

Communication dated Jan. 22, 2021, issued by the European Patent Office in counterpart European Application No. 20194212.5.

* cited by examiner

*Primary Examiner* — Ibrahim Siddo
(74) *Attorney, Agent, or Firm* — Sughrue Mion, PLLC

(57) ABSTRACT

An electronic apparatus includes: at least one processor configured to: receive audio of a voice input of a user; obtain, from a plurality of voice recognizers capable of recognizing the voice input, a plurality of recognition results of the received audio; and perform an operation based on a recognition result of which recognition suitability for the voice input is identified to be high, among the plurality of recognition results.

15 Claims, 15 Drawing Sheets

ELECTRONIC APPARATUS AND CONTROL METHOD THEREOF

CROSS-REFERENCE TO RELATED THE APPLICATION

This application is based on and claims priority under 35 U.S.C. § 119 to Korean Patent Application No. 10-2019-0109157 filed on Sep. 3, 2019, in the Korean Intellectual Property Office, the disclosure of which is incorporated by reference herein in its entirety.

BACKGROUND

Field

The disclosure relates to an electronic apparatus that obtains a voice recognition result of a user utterance and performs an operation corresponding to the obtained result, and a control method thereof, and more particularly to an electronic apparatus and a control method thereof that are related to accuracy of text data converted from an audio signal of a user's utterance.

Description of the Related Art

To compute and process predetermined information in accordance with certain processes, an electronic apparatus typically includes a central processing unit (CPU), a chipset, a memory, and the like electronic components for the computation. Such an electronic apparatus may be variously classified in accordance with the information that is processed and what it is used for. For example, the electronic apparatus is classified into an information processing apparatus such as a personal computer (PC), a server or the like for processing general information, an image processing apparatus for processing image data; an audio apparatus for audio process, home appliances for miscellaneous household chores, etc. The image processing apparatus may be embodied by a display apparatus that displays an image based on processed image data on its own display panel.

The electronic apparatus receives a user input, and performs a previously designated operation based on a command corresponding to the received user input. There are various user input methods according to the kinds of interfaces. For example, the electronic apparatus may receive a control signal based on a user's control from a button or a controller, detect a user's gesture through a camera, perform eye-tracking through the camera, or receive an audio signal based on a user's utterance through a microphone. In particular, the electronic apparatus obtains or determines a command based on a result from a voice recognition process of the user's utterance, and performs an operation based on the obtained command.

The voice recognition process includes a process of converting an audio signal corresponding to a user's utterance into text data interpretable by a processor. Such a process is called a speech-to-text (STT) process. A hardware/software component for carrying out the STT process is called a voice recognizer or a voice recognition engine. The voice recognition engine is achieved by various modeling techniques. For example, an acoustic model is achieved by statistically modeling voices uttered by various speakers based on a hidden Markov model or the like algorithm, and a language model is achieved by collecting a corpus (i.e., a data collection of texts to be treated, processed and analyzed by a computer for language study). Such models form the voice recognition engine.

The voice recognition engine may be provided in an electronic apparatus, or may be provided in a server to which the electronic apparatus can have an access. However, parameters taken into account during the modeling of the voice recognition engine may vary depending on the kinds of speakers whose data and corpus is used in modeling the voice recognition engine or what the manufacturers of the voice recognition engine are interested in. Consequently, a voice recognition result provided by a predetermined voice recognition engine may not be accurately suitable for an intention corresponding to a user's utterance.

In this regard, it is important for the electronic apparatus to produce a voice recognition result as suitable as possible for an intention contained in or corresponding to a user's utterance when the user's utterance is input.

SUMMARY

Provided are an electronic apparatus and a method of obtaining a voice recognition result of a user voice input with high reliability.

Additional aspects will be set forth in part in the description which follows and, in part, will be apparent from the description, or may be learned by practice of the presented embodiments.

In accordance with an aspect of the disclosure, an electronic apparatus includes at least one processor configured to: receive audio of a voice input of a user; obtain, from a plurality of voice recognizers capable of recognizing the voice input, a plurality of recognition results of the received audio; and perform an operation based on a recognition result of which recognition suitability for the voice input is identified to be high, among the plurality of recognition results.

The voice input may include a previously-registered confused word; and the at least one processor may be further configured to identify that the recognition suitability of a recognition result including the confused word, from among the plurality of recognition results, is high.

The at least one processor may be further configured to identify the recognition result including the confused word based on a list including a plurality of confused words.

The plurality of confused words included in the list may include at least one of a word not included in a previously-registered dictionary, a proper noun, or a word of which recognition failed in a previous recognition result.

The at least one processor may be further configured to identify a voice recognizer, of which the recognition suitability is high, based on a characteristic of a situation in which the voice input is captured, and to obtain the recognition result from the identified voice recognizer.

The voice input may be captured while the electronic apparatus is providing content or a service; and the at least one processor may be further configured to identify that the recognition suitability of a recognition result, which is related to the provided content or service, among the plurality of recognition results is high.

The at least one processor may be further configured to identify that the recognition suitability of a recognition result, which is related to the user who provides the voice input, among the plurality of recognition results is high.

The at least one processor may be further configured to identify that the recognition suitability of a recognition result, which is related to an external apparatus connectable to the electronic apparatus, among the plurality of recognition results is high.

In accordance with another aspect of the disclosure, a method of controlling an electronic apparatus includes: receiving audio of a voice input of a user; obtaining, from a plurality of voice recognizers capable of recognizing the voice input, a plurality of recognition results of the received audio; and performing an operation based on a recognition result of which recognition suitability for the voice input is identified to be high, among the plurality of recognition results.

In accordance with another aspect of the disclosure, a non-transitory computer-readable recording medium has recorded thereon instructions executable by at least one processor to perform the method.

In accordance with another aspect of the disclosure, an electronic apparatus includes at least one processor configured to: receive a user input to a sensor; obtain, from a plurality of recognizers capable of recognizing the user input, a plurality of recognition results of the received user input; and perform an operation based on a recognition result of which recognition suitability for the user input is identified to be high, among the plurality of recognition results.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Below, embodiments will be described in detail with reference to accompanying drawings. Further, embodiments described with reference to the accompanying drawings are not exclusive to each other unless otherwise mentioned, and a plurality of embodiments (or components thereof) may be selectively combined within one apparatus. The combination of these plural embodiments may be discretionally selected and applied to realize the present inventive concept by a person having an ordinary skill in the art.

In the description of embodiments, an ordinal number used in terms such as a first element, a second element, etc., is employed for describing a variety of elements, and the terms are used for distinguishing between one element and another element. Therefore, the meanings of the elements are not limited by the terms, and the terms are also used just for explaining the corresponding embodiment without limiting the disclosure.

Further, expressions such as "at least one" among a plurality of elements in the disclosure represents not only all the elements but also each one of the elements, which excludes the other elements or all combinations of the elements. For example, "at least one of [A] and [B]" means only A, only B, or A and B.

Figure 1:
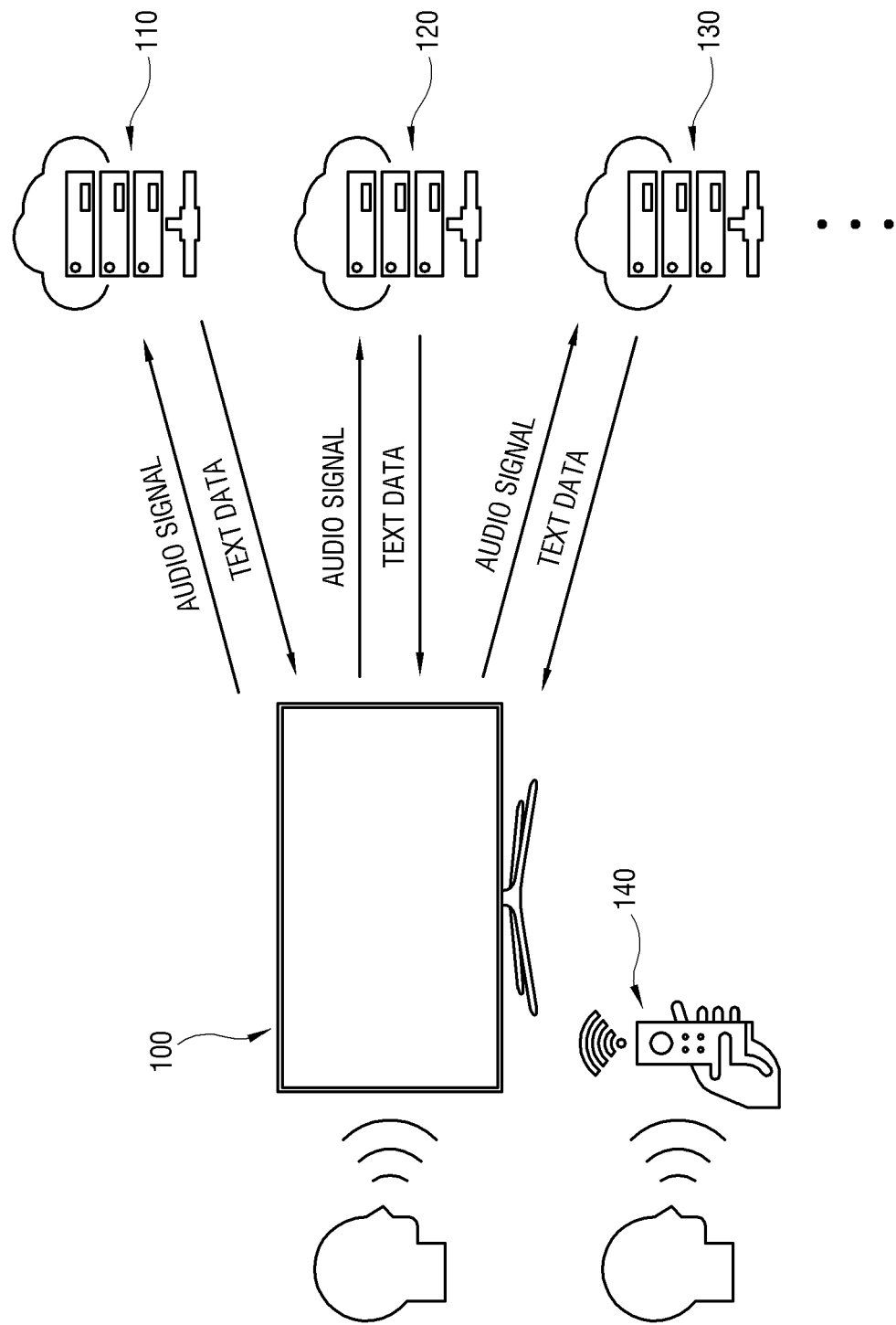
FIG. 1 illustrates an environment in which an electronic apparatus obtains a voice recognition result of a user utterance according to an embodiment.

FIG. 1 illustrates an environment in which an electronic apparatus 100 obtains a voice recognition result of user utterance, according to an embodiment.

As shown in FIG. 1, the electronic apparatus 100 according to an embodiment may be a display apparatus capable of displaying an image. For example, the electronic apparatus 100 includes a television (TV), a computer, a tablet computer, a portable media player, a wearable device, a video wall, an electronic frame, a navigation device, etc. It is understood, however, that the electronic apparatus 100 may be embodied by various kinds of apparatuses such as: a set-top box or the like image processing apparatus having no display; a refrigerator, a washing machine or the like home appliances; a computer main body or the like information processing apparatus; a vehicle control system; etc., as well as the display apparatus. Further, the electronic apparatus 100 may be a stationary apparatus installed at a fixed position, or a mobile apparatus usable while being carried by a user.

The electronic apparatus 100 may receive a user's voice. In other words, the electronic apparatus 100 obtains an audio signal corresponding to an utterance when a user speaks. To obtain the audio signal based on the utterance, the electronic apparatus 100 may include a microphone (or any other type of audio sensor) for collecting (or capturing) the utterance, or may receive the audio signal from a remote controller 140 or separate external apparatus that has a microphone.

The electronic apparatus 100 obtains a result from a voice recognition process of the obtained audio signal corresponding to the user utterance, and performs an operation based on a command corresponding to the voice recognition result. Here, the voice recognition process includes a speech-to-text process for converting the audio signal into text data, and a command identifying-and-performing process for identifying a command in the text data and performing an operation based on the identified command. For example, when a user says "volume up," the electronic apparatus 100 obtains text data by applying a voice recognition process to an audio signal of the utterance, identifies a command in the obtained text data, and turns up the volume of the electronic apparatus 100 based on the identified command.

Both the STT process and the command identifying-and-performing process of the voice recognition process may be performed in the electronic apparatus 100. Alternatively, at least some of the process may be performed by servers 110, 120 and 130 to which the electronic apparatus 100 is accessibly connected to through a network. For example, the servers 110, 120 and 130 may perform the STT process, and the electronic apparatus 100 may perform the command identifying-and-performing process. Alternatively, the servers 110, 120 and 130 may perform all the STT process and the command identifying-and-performing process, and the electronic apparatus 100 may only receive results from the servers 110, 120 and 130. In the present embodiment, it will be described that the servers 110, 120 and 130 perform the STT process and the electronic apparatus 100 performs the command identifying-and-performing process. It is understood, however, that the processes may be performed in the electronic apparatus 100 or the servers 110, 120 and 130 without limitations under a designable environment for the voice recognition process.

To perform the STT process, a voice recognition engine for substantially carrying out the corresponding process is to be established. In the present embodiment, the servers 110, 120 and 130 are individually provided with the voice recognition engines. The voice recognition engine may have unique characteristics based on a developer, a manufacturer, speaker and corpus data used in developing a model, etc. With such characteristics, the voice recognition engines may output different voice recognition results with respect to the same audio signal.

The electronic apparatus 100 receives recognition results of the audio signal corresponding to the user utterance from the plurality of servers 110, 120 and 130. The electronic apparatus 100 identifies a recognition result, of which recognition suitability for an utterance-based audio signal is relatively high, among the plurality of recognition results respectively received from the plurality of servers 110, 120 and 130.

For example, the electronic apparatus 100 transmits an audio signal to each of the plurality of servers 110, 120 and 130. Each of the servers 110, 120 and 130 receives the audio signal, uses its own voice recognition engine to produce a recognition result, and outputs the produced recognition result to the electronic apparatus 100. The electronic apparatus 100 selects the recognition result, of which the recognition suitability for the utterance-based audio signal is relatively high, among the plurality of recognition results respectively obtained from the plurality of servers 110, 120 and 130.

Thus, the electronic apparatus 100 can produce or obtain a voice recognition result as suitable as possible for an intention contained in (or corresponding to) a user's utterance. A detailed method of identifying the recognition suitability for the utterance-based audio signal is described below.

Below, a configuration of the electronic apparatus 100 according to an embodiment is described.

Figure 2:
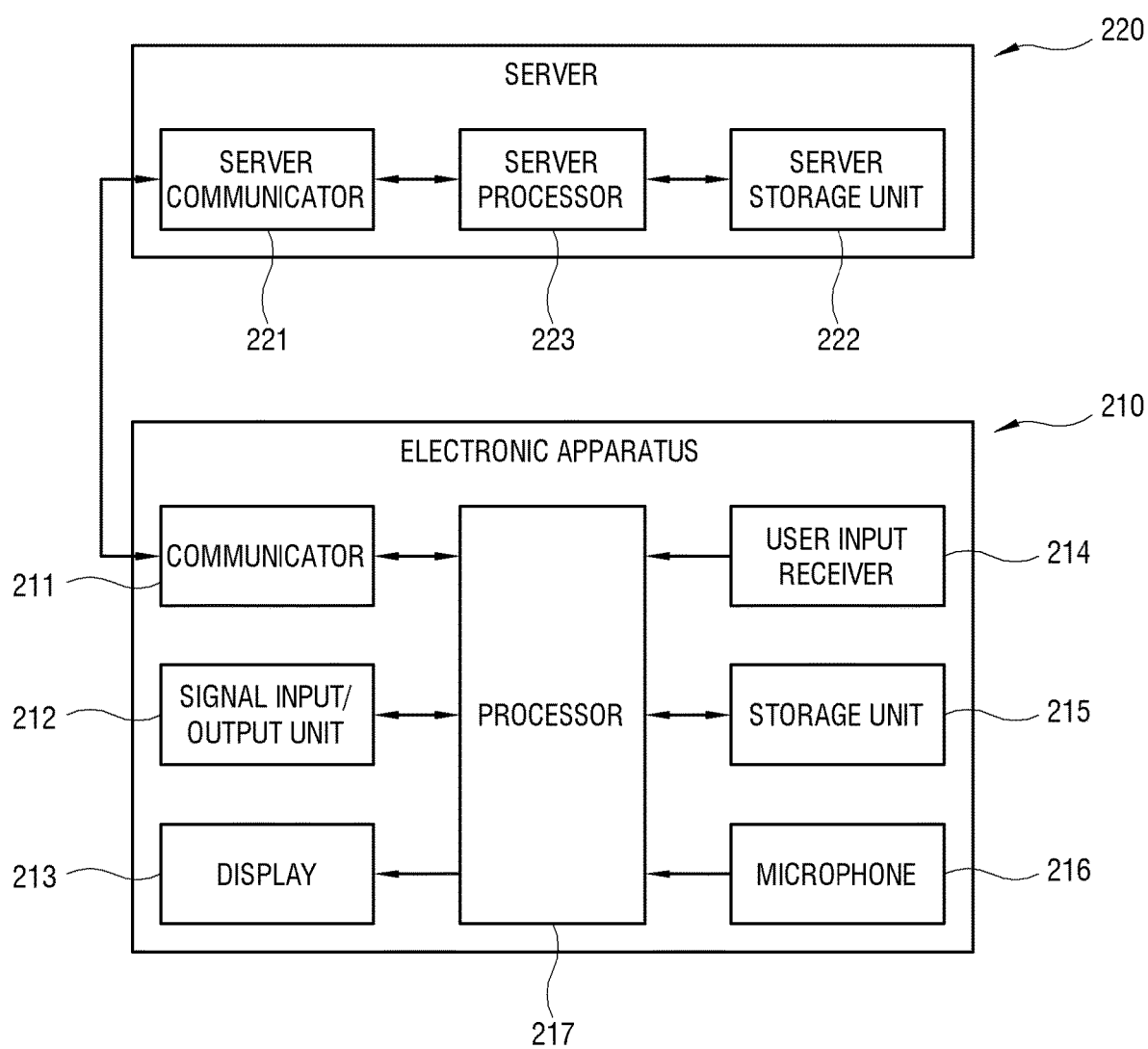
FIG. 2 is a block diagram of an electronic apparatus according to an embodiment.

FIG. 2 is a block diagram of an electronic apparatus 210.

As shown in FIG. 2, the electronic apparatus 210 includes a communicator 211, a signal input/output unit 212 (or signal inputter/outputter), a display 213, a user input unit 214 (or user inputter), a storage unit 215 (or storage), a microphone 216, and a processor 217 (or at least one processor). A server 220 includes a server communicator 221, a server storage unit 222, and a server processor 223. While in FIG. 2, there is representatively shown only one server 220, it is understood that the electronic apparatus 210 is actually connected for communication to a plurality of servers 220.

Below, the configuration of the electronic apparatus 210 is described. In the present embodiment, the electronic apparatus 210 is described as a TV. It is understood, however, that the electronic apparatus 210 may be embodied by various kinds of apparatuses, and therefore the electronic apparatus 210 is not limited to the TV. For example, according to another embodiment, the electronic apparatus 210 may not be a display apparatus, and may not include the display 213 and the like elements for displaying an image. For example, when the electronic apparatus 210 is embodied by a set-top box, the electronic apparatus 210 may output an image signal to an external apparatus such as a TV through the signal input/output unit 212.

The communicator 211 refers to an interactive communication circuit that includes at least one of elements, such as a communication module, a communication chip, etc., corresponding to various wired and wireless communication protocols. For example, the communicator 211 may be embodied by a wireless communication module that performs wireless communication with an access point (AP) based on Wi-Fi, a wireless communication module that performs one-to-one direct wireless communication based on Bluetooth or the like, or a local area network (LAN) card that is connected to a router or a gateway by a wire. The communicator 211 communicates with a server 220 on a network, thereby transmitting and receiving a data packet to and from the server 220. Alternatively, the communicator 211 may communicate with a remote controller separated from the main body of the electronic apparatus 210, thereby receiving a control signal from the remote controller.

The signal input/output unit 212 is one-to-one or one-to-N (where, N is a natural number) connected to an external apparatus such as a set-top box or an optical media player by a wire, thereby receiving or outputting data from and to the corresponding external apparatus. The signal input/output unit 212 may, for example, include a high definition multimedia interface (HDMI) port, a DisplayPort, a DVI port, a Thunderbolt, a universal serial bus (USB) port, and the like connectors or ports according to preset transmission standards.

The display 213 includes a display panel capable of displaying an image on a screen. The display panel is provided to have a light receiving structure such as a liquid crystal type, or a self-emissive structure such as an organic light emitting diode (OLED) type. The display 213 may include an additional element according to the structures of the display panel. For example, when the display panel is the liquid crystal type, the display 213 includes a liquid crystal display panel, a backlight unit configured to emit light, and a panel driving substrate configured to drive liquid crystal of the liquid crystal display panel.

The user input unit 214 includes circuitry related to various input interfaces provided to be controlled by a user to make an input. The user input unit 214 may be variously configured according to the kinds of electronic apparatus 210 and may, for example, include a mechanical or electronical button of the electronic apparatus 210, a touch pad, a touch screen installed in the display 213, etc.

The storage unit 215 is configured to store digitized (or digital) data. The storage unit 215 includes a nonvolatile storage in which data is retained regardless of whether power is on or off, and a volatile memory into which data to be processed by the processor 217 is loaded and in which data is retained only when power is on. The storage includes at least one of a flash memory, a hard-disc drive (HDD), a solid-state drive (SSD), a read only memory (ROM), etc., and the memory includes a buffer, a random-access memory (RAM), etc.

The microphone 216 or a voice input unit collects sounds from external environments, such as a user's utterance. The microphone 216 transmits audio signals of collected sounds to the processor 217. The microphone 216 may be provided in the main body of the electronic apparatus 210, or in a remote controller (or other external device) separated from the main body of the electronic apparatus 210. In the latter case, the audio signal collected in (or captured by) the microphone 216 is transmitted from the remote controller to the communicator 211. In more detail of the latter case, an audio signal of a user's utterance collected in the microphone 216 of the remote controller is converted into a digital signal. The remote controller transmits the converted digital signal to the communicator 211 based on a protocol for communication with the communicator 211, for example, Bluetooth, Wi-Fi, ZigBee, etc. The digital signal received in the communicator 211 is transmitted to and processed by the processor 217. Many procedures of transmitting a voice uttered by a user to the processor 217 are described below.

The processor 217 includes one or more hardware processors achieved by a central processing unit (CPU), a chipset, a buffer, a circuit, etc., which are mounted on a printed circuit board (PCB). Alternatively, the processor 217 may be designed as a system on chip (SoC). The processor 217 includes modules corresponding to various processes, such as a demultiplexer, a decoder, a scaler, an audio digital signal processor (DSP), an amplifier, etc., when the electronic apparatus 210 is embodied by a display apparatus. Among such modules, some or all of the modules may be achieved by the SoC. For example, a demultiplexer, a decoder, a scaler, and the like module related to an image process may be achieved as an image processing SoC, and an audio DSP may be achieved as a chipset separated from the SoC.

The processor 217 transmits an audio signal obtained by the microphone 216 to the server 220 through the communicator 211, and receives text data as a voice processing result of the audio signal from one or more servers 220 through the communicator 211. The processor 217 processes one or more pieces of text data received from one or more servers 220, and performs an operation based on the text data.

Below, a configuration of the server 220 according to an embodiment is described.

The server communicator 221 refers to an interactive communication circuit that includes at least one of elements, such as a communication module, a communication chip, etc., corresponding to various wired and wireless communication protocols. The server communicator 221 supports communication standards corresponding to the communicator 211 of the electronic apparatus 210, thereby communicating with various kinds of clients such as the electronic apparatus 210 through a wide area network (WAN).

The server storage unit 222 (or server storage) allows the server processor 223 to perform reading, writing, modifying, deleting, updating, and the like operation with regard to data. The server storage unit 222 includes various nonvolatile and volatile memories such as at least one of a flash memory, an HDD, an SSD, a buffer, a RAM, etc. In the present embodiment, the server storage unit 222 includes one or more voice recognition engines to perform the STT process for an audio signal.

The server processor 223 (or at least one processor) includes one or more hardware processors achieved by a CPU, a chipset, a buffer, a circuit, etc., which are mounted on a PCB. Alternatively, the processor 217 may be designed as a SoC. The server processor 223 may perform various processes based on information received from the electronic apparatus 210. For example, the server processor 223 receives an audio signal from the electronic apparatus 210, performs the STT process for the audio signal through the voice recognition engine stored in the server storage unit 222, and transmits the text data produced as a result of the STT process to the electronic apparatus 210 through the server communicator 221.

Meanwhile, the processor 217 of the electronic apparatus 210 identifies a recognition result, of which recognition suitability for the uttered voice is relatively high, among the plurality of recognition results received from the plurality of servers 220, and performs at least one of data analysis, data process and result information generation for identifying a command based on the identified recognition result based on at least one of machine learning, a neural network, deep learning algorithms as a rule-based or artificial intelligent (AI) algorithm.

For example, the processor 217 may operate as a learner (or trainer) and a recognizer. The trainer may perform a function of generating the learned (or trained) neural network, and the recognizer may perform a function of recognizing (or inferring, predicting, estimating and identifying) the data based on the trained neural network. The trainer may generate, update, and/or train the neural network. The trainer may obtain learning data (or training data) to generate the neural network. For example, the trainer may obtain the training data from the storage unit 216 (to be described below) or from the outside. The training data may be data used for training the neural network, and the data subjected to the foregoing operations may be used as the training data to train the neural network.

Before training the neural network based on the training data, the trainer may perform a preprocessing operation with regard to the obtained training data or select data to be used for training among a plurality of pieces of the training data. For example, the trainer may process the training data to have a preset format, apply filtering to the training data, or process the training data to be suitable for the training by adding/removing noise to/from the training data. The trainer may use the preprocessed training data for generating the neural network set to perform the operations.

The trained neural network may include a plurality of neural networks (or layers). The nodes of the plurality of neural networks have weights, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Meanwhile, the recognizer may obtain target data to carry out the foregoing operations. The target data may be obtained from the storage unit 216 or the outside. The target data may be data targeted to be recognized by the neural network. Before applying the target data to the trained neural network, the recognizer may perform a preprocessing operation with respect to the obtained target data, or select data to be used in recognition among a plurality of pieces of target data. For example, the recognizer may process the target data to have a preset format, apply filtering to the target data, or process the target data into data suitable for recognition by adding/removing noise. The recognizer may obtain an output value output from the neural network by applying the preprocessed target data to the neural network. Further, the recognizer may obtain a stochastic value or a reliability value together with the output value.

With this configuration, a method of obtaining a result from applying the STT process to a user's utterance may be performed by the electronic apparatus 210.

Figure 3:
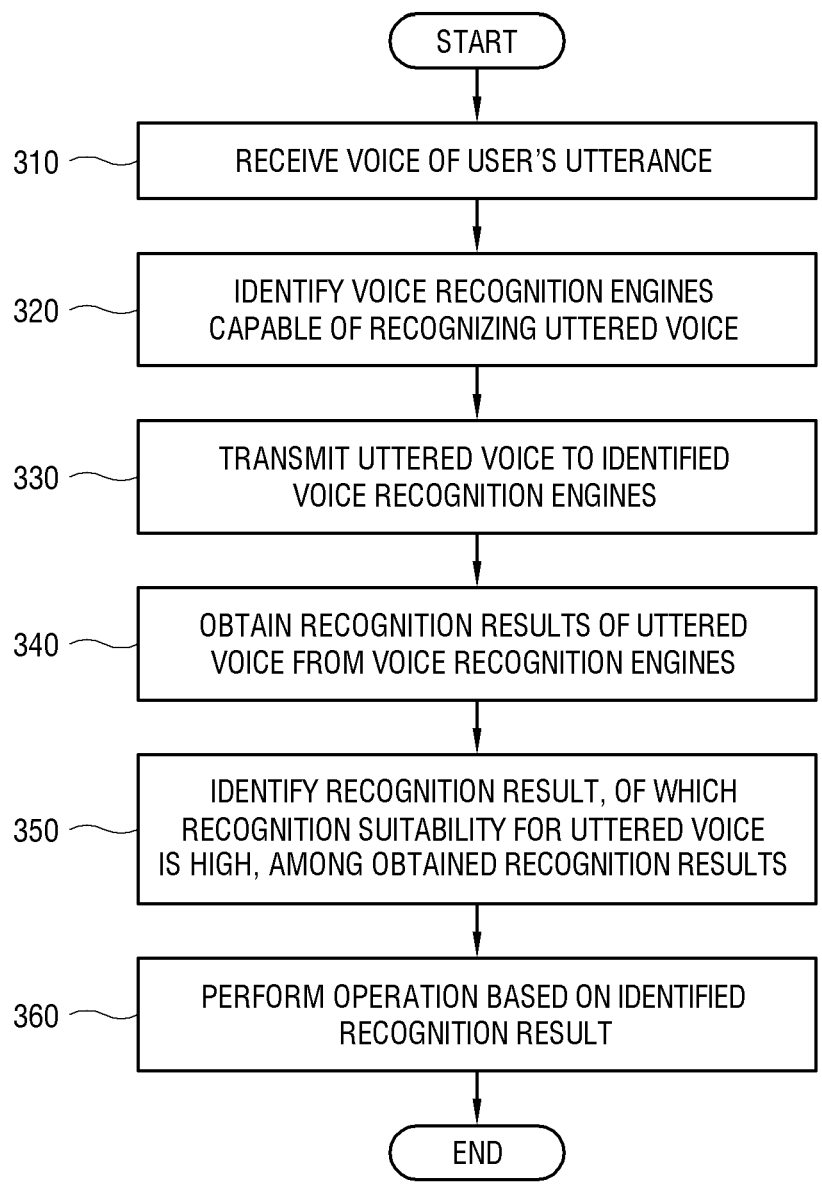
FIG. 3 is a flowchart showing a method of controlling an electronic apparatus according to an embodiment.

FIG. 3 is a flowchart showing a method of controlling an electronic apparatus according to an embodiment.

As shown in FIG. 3, the following operations are performed by the processor of the electronic apparatus.

At operation 310, the electronic apparatus receives a voice (or voice signal, audio signal, audio data, etc.) based on a user's utterance.

At operation 320, the electronic apparatus identifies a plurality of voice recognizers or voice recognition engines capable of recognizing the uttered voice. When the plurality of servers respectively include the voice recognition engines, the electronic apparatus may check whether communication with each server is possible to obtain a recognition result of the uttered voice.

At operation 330, the electronic apparatus transmits the uttered voice to each of the plurality of identified voice recognition engines. Here, the electronic apparatus transmits the same uttered voice to the plurality of voice recognition engines.

At operation 340, the electronic apparatus obtains a recognition result of the uttered voice from the plurality of voice recognition engines to which the uttered voice is transmitted.

At operation 350, the electronic apparatus identifies a recognition result, of which the recognition suitability for the uttered voice is relatively high (or highest), among the plurality of obtained recognition results.

At operation 360, the electronic apparatus performs an operation based on the identified recognition result.

Thus, the electronic apparatus selects the recognition result, of which the recognition suitability for the uttered voice is relatively high, among the plurality of obtained recognition results from the plurality of voice recognition engines, thereby more accurately performing a voice recognition operation.

The recognition suitability may be identified by various methods. Below, detailed embodiments in which the electronic apparatus identifies the recognition result based on the recognition suitability are described.

Figure 4:
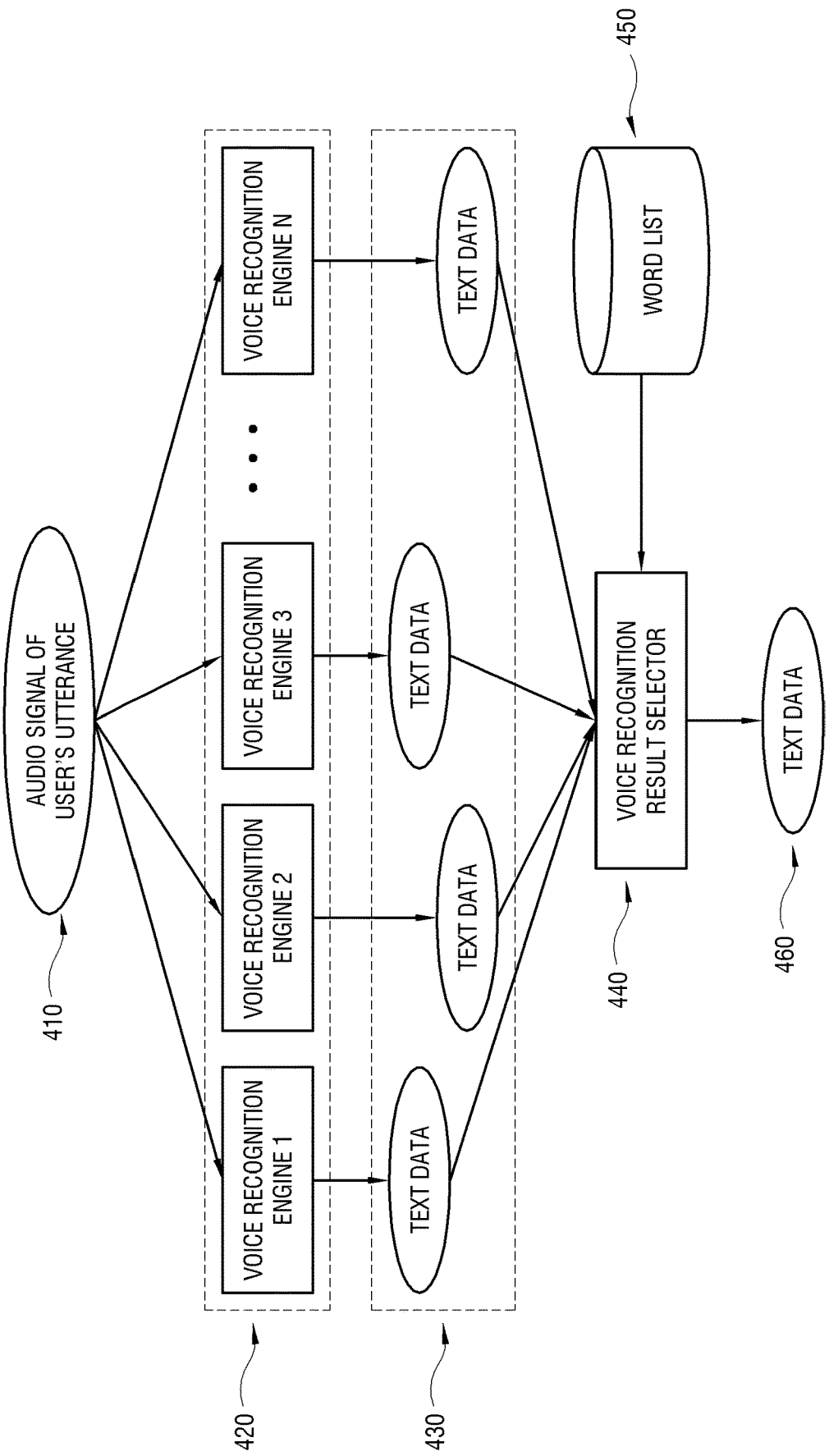
FIG. 4 is a block diagram showing a structure in which an electronic apparatus selects one among a plurality of voice recognition results based on a word list, according to an embodiment.

FIG. 4 is a block diagram showing a structure in which an electronic apparatus selects one among a plurality of voice recognition results based on a word list.

As shown in FIG. 4, the electronic apparatus obtains N pieces of text data 430 corresponding to an audio signal 410 of an input user utterance (where N is a natural number greater than or equal to 2). N pieces of text data 430 are respectively generated by N voice recognition engines 420, and represent the voice recognition results with respect to the same audio signal 410. These voice recognition engines 420 are respectively provided in the electronic apparatuses, the external apparatuses and/or the server. Further, one apparatus (or server) may include one voice recognition engine 420, or one apparatus (or server) may include two or more voice recognition engines 420. In other words, one or more voice recognition engines 420 may be provided in the electronic apparatus, and the rest of voice recognition engines 420 may be provided in the server. Alternatively, the plurality of voice recognition engines 420 may be respectively provided in the individual servers. Alternatively, one or more among the plurality of voice recognition engines 420 may be provided in the electronic apparatus, and the rest of voice recognition engines 420 may be provided in an external apparatus capable of performing near field communication, Bluetooth communication, etc. (or another type of wireless communication) with the electronic apparatus.

A voice recognition result selector 440 selects one piece of text data 460, of which recognition suitability for the audio signal 410 of the utterance is relatively high (or highest), among the pieces of the text data 460 from N voice recognition engines 420. Here, the voice recognition result selector 440 may select one piece of text data 460, of which recognition suitability for the audio signal 410 of the utterance is relatively high based on a word list 450, among the pieces of the text data 460 from N voice recognition engines 420

The voice recognition result selector 440 may be a processor of the electronic apparatus, or may be an operating system, middleware or an application to be executed by the processor. Alternatively, the voice recognition result selector 440 may be the processor of the server or the external apparatus, or may be an operating system, middleware or an application to be executed by the processor of the server or the external apparatus.

The word list 450 includes words that have not been included in a usual standard dictionary, or includes words of which voice recognition results are previously expected not to be correct even though they have been included in the standard dictionary. For convenience of description, such words of the word list 450 will be called confused words. There is a high probability that the text data 430 from the voice recognition results of the words included in the standard dictionary will be correct, even though the probabilities are different according to the structures of the voice recognition engines 420. On the other hand, the probability of the words, which have not been included in the standard dictionary, may be low. The word list 450 includes words, which are expected to be more frequently used at a current point in time, among the words of which the voice recognition results are relatively less accurate. An example of creating and establishing the word list 450 is described below.

When N pieces of text data 430 are of the same content, the voice recognition result selector 440 may finally select one piece among the N pieces of text data 430 without any separate process.

On the other hand, when at least some among N pieces of text data 430 are different in content, the voice recognition result selector 440 first identifies different words among the pieces of text data 430. The voice recognition result selector 440 identifies one or more words, which correspond to one or more words included in the word list 450, among the identified words. When the word(s) corresponding to the word list 450 are identified, the voice recognition result selector 440 finally selects text data 460, which contains the corresponding word(s), among the N pieces of text data 430. In other words, when the text data 460 contains the confused words included in the word list 450, the voice recognition result selector 440 identifies that the recognition suitability for the audio signal 410 from the voice recognition engine 420 providing the text data 460 is relatively high.

Thus, the voice recognition result selector 440 may select text data 460 among N pieces of text data 430 based on the word list 450.

Alternatively, according to another embodiment, when a percentage of the text data of the same content among the N pieces of text data 430 is greater than a threshold, the voice recognition result selector 440 may select the text data 430, of which the percentage is greater than the threshold, without reference to the word list 450. In other words, it may be designed that the result of a plurality of voice recognition engines is accepted without any additional process when the plurality of voice recognition engines (e.g., more than X number of voice recognition engines, or more than Y percentage of the voice recognition engines) output the same result.

For example, N=10 and the threshold of 60% will be assumed. When seven pieces of text data 430 are of the same content among ten pieces of text data 430, the voice recognition result selector 440 selects one among the seven pieces of text data 430. On the other hand, when four pieces of text data 430 are of the same content among ten pieces of text data 430, the voice recognition result selector 440 may select the text data 460 based on the word list 450 as described above.

The voice recognition result selector 440 or the word list 450 may be provided in the electronic apparatus, but may also be designed to be provided in the external apparatus or the server. For example, the electronic apparatus with the voice recognition result selector 440 may obtain and refer to the corresponding word list 450 stored in the server. Alternatively, the voice recognition result selector 440 and the word list 450 may be provided in the external apparatus or the server, and the electronic apparatus may receive a result from the operation of the voice recognition result selector 440. When the server is storing the word list 450, the server may be embodied as a server of a voice recognition assistant or a separate server for covering other various situations.

Meanwhile, there are many methods or algorithms of identifying a word corresponding to the word list 450 among different words of the N pieces of text data 430. Below, an example identifying method is described.

Figure 5:
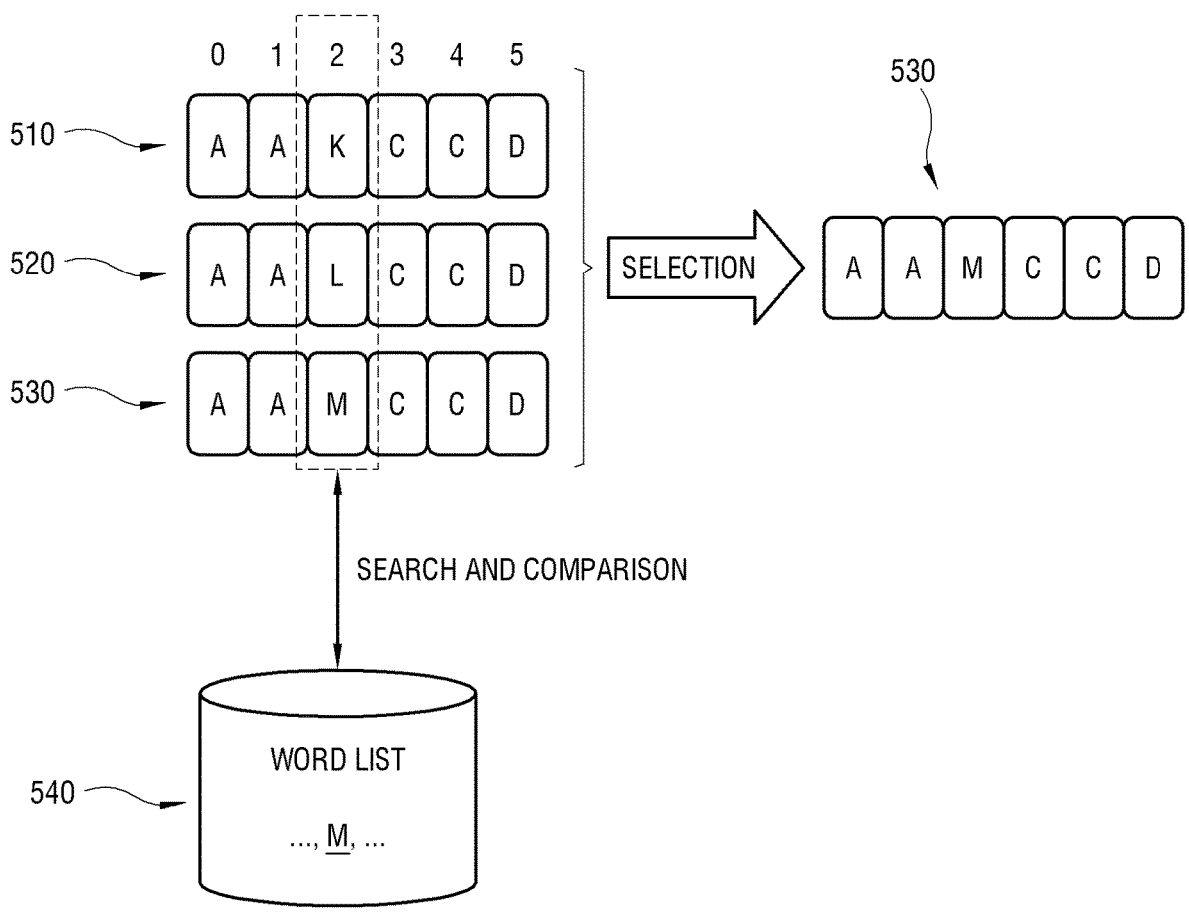
FIG. 5 schematically illustrates a principle of an electronic apparatus identifying one among a plurality of pieces of text data, according to an embodiment.

FIG. 5 schematically illustrates a principle of an electronic apparatus identifying one among a plurality of pieces of text data, according to an embodiment.

As shown in FIG. 5, the electronic apparatus may obtain the plurality of pieces of text data 510, 520 and 530, for example, three pieces of text data 510, 520 and 530, as a voice recognition result of an audio signal based on a user's utterance. Each piece of the text data 510, 520 and 530 may be represented in a word structure in which an arrangement sequence of words is taken into account. In first text data 510, a word of "A" comes out at the foremost $0^{th}$ position, a word of "A" comes out at the Pt position, a word of "K" comes out at the $2^{nd}$ position, a word of "C" comes out at the $3^{rd}$ position, a word of "C" comes out at the $4^{th}$ position, and a word of "D" comes out at the 5th position. Thus, the word structure of the first text data 510 is represented with "AAKCCD". On the same principle, the word structure of the second text data 520 may be represented with "AALCCD", and the word structure of the third text data 530 may be represented with "AAMCCD". Here, "A", "C", "D", "K", "L" and "M" respectively indicate words which are different from one another.

The electronic apparatus identifies whether different words are present among the plurality of pieces of text data 510, 520 and 530. The different words among the plurality of pieces of text data 510, 520 and 530 are the words at the $2^{nd}$ positions of the text data 510, 520 and 530. The words at the $2^{nd}$ positions are "K" of the first text data 510, "L" of the second text data 520, and "M" of the third text data 530.

The electronic apparatus identifies whether there is a confused word (e.g., a word that is predetermined as one that may be confused with another word) included in a word list 540 among the words at the $2^{nd}$ position of the text data 510, 520 and 530, and finally selects the text data including the corresponding confused word. When it is identified that "M" among search target words "K", "L" and "M" is included in the word list 540, the electronic apparatus selects the third text data 530 including "M."

Thus, the electronic apparatus may select one among the plurality of pieces of text data 510, 520 and 530 based on the word list 540.

The method of selecting the text data based on the word list is not limited to the foregoing embodiment, and there may be various methods. For example, the electronic apparatus may identify a word corresponding to the word list among the plurality of words, based on a term frequency-inverse document frequency (TF-IDF) algorithm. The TF-IDF refers to a method of giving weight factors to words according to how important the words are in a document-term matrix (DTM) based on a term frequency (TF) and an inverse document frequency (IDF).

Below, a method of creating and updating a word list according to an embodiment is described.

Figure 6:
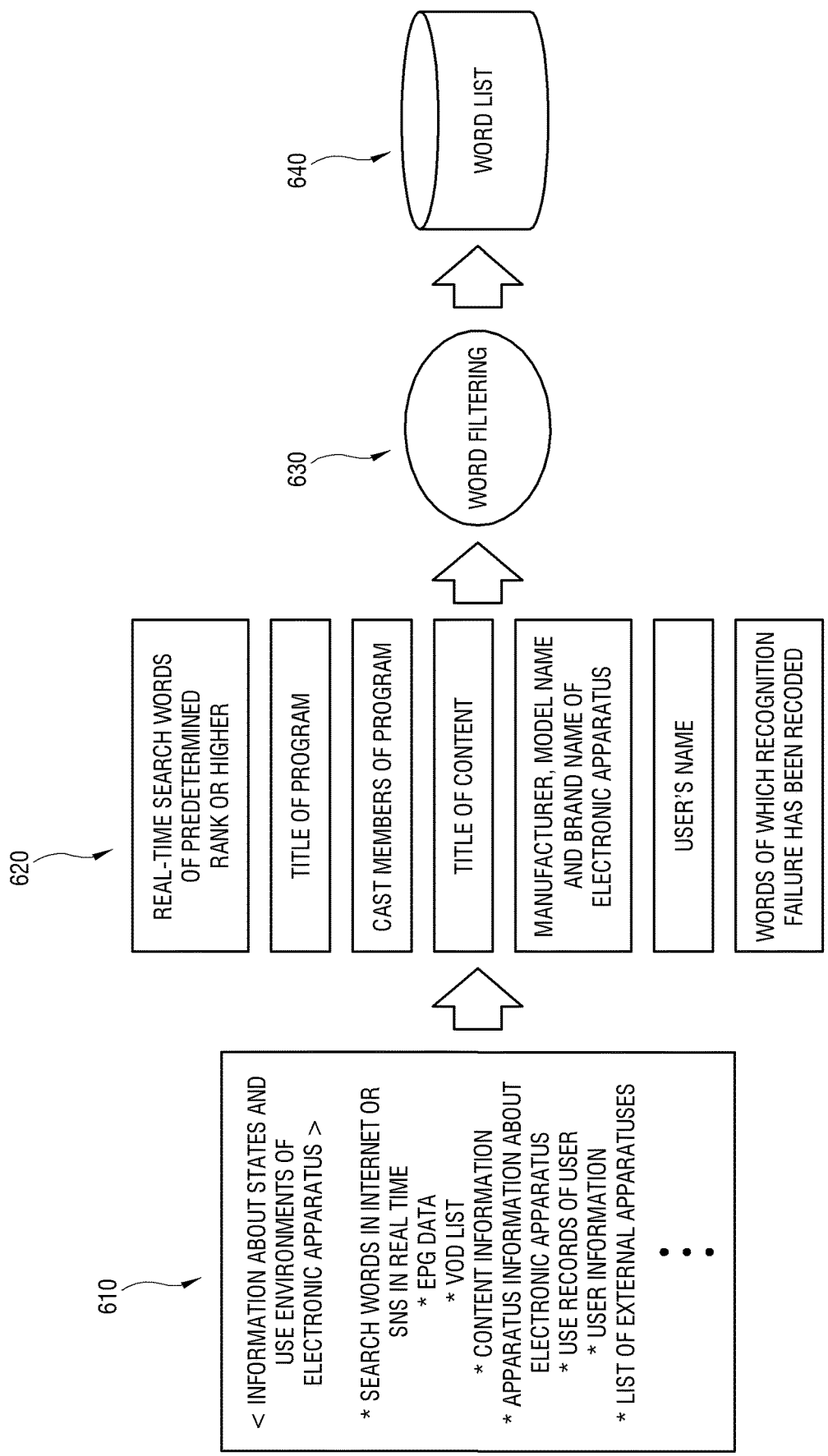
FIG. 6 illustrates a method of an electronic apparatus to create and update a word list, according to an embodiment.

FIG. 6 illustrates a method of creating and updating a word list, according to an embodiment.

As shown in FIG. 6, the electronic apparatus obtains information 610 about states and use environments of an electronic apparatus from various sources, and creates a word list 640 based on the obtained information 610. Further, the electronic apparatus updates the word list 640 by a method equivalent to that of creating the word list 640. The word list 640 may be created and updated by the external apparatus, the server, etc., as well as the electronic apparatus. The word list 640 may be updated in real time. However, to reduce a load caused by updating, the word list 640 may be periodically updated, or may be updated when the system load of the electronic apparatus is relatively low (e.g., below a predetermined threshold level). Alternatively, the electronic apparatus may display a user interface (UI) for asking a user whether to update the word list 640, and selectively perform updating based on a user's input to the UI.

The information 610 about the states and use environments of the electronic apparatus may include various kinds of information obtained from various sources. Such information 610 may, for example, include: search words searched by a plurality of users through the Internet or social network services in real time; electronic program guide (EPG) data provided by broadcast content providers in relation to broadcasting programs; a video on demand (VOD) list provided by a streaming server; content information provided by various content service providers; apparatus information about the electronic apparatus previously stored in the electronic apparatus; use records obtained from a user account of a user who uses the electronic apparatus; user information such as a phone number, a name, etc., stored in the electronic apparatus; a list of external apparatuses being connected to the electronic apparatus; a list of external apparatuses expected to be connectable to the electronic apparatus in the future even though the external apparatuses are not currently connected to the electronic apparatus (for example, a list of external apparatuses that have previously been connected to the electronic apparatus, external apparatuses connectable to the electronic apparatus, etc.); etc.

The electronic apparatus obtains a plurality of words 620 based on a preset reference from such information 610, and creates the word list 640 based on the obtained words 620. The reference may be varied depending on the attributes of the information 610, without being limited to specific conditions.

For example, the electronic apparatus obtains search words of a predetermined rank or higher from the obtained real-time search words. The electronic apparatus obtains a title of a program and cast members of the program from the EPG data and the VOD list. The electronic apparatus obtains a title of content from content information. The electronic apparatus obtains the manufacturer, model name and brand name of the electronic apparatus from the apparatus information. The electronic apparatus obtains a user's name from the use records of the user; the manufacturer, model name and brand name of many electronic apparatuses owned by the user; and words, of which recognition failure has been recoded, from previous recognition results.

Such obtained words 620 reflect a trend at a point in time when the information 610, from which the corresponding words are obtained, is obtained.

The electronic apparatus may create or update the word list 640 with all the obtained (or selected, drawn, etc.) words 620 regarded as the confused words. However, to more efficiently create or update the word list 640, the electronic apparatus may create or update the word list 640 with the confused words selected by applying filtering 630 to the obtained words 620.

There are many methods of applying the filtering 630. For example, the electronic apparatus may exclude words, which are included in the standard dictionary, from the obtained words 620, and include the other (remaining) words to the word list 640. Alternatively, the electronic apparatus may include a proper noun among the obtained words 620 in the word list 640. The standard dictionary of a predetermined language may be compiled and proposed by an organization or scholars certified in societies or countries using the corresponding language. When the voice recognition engine is designed, the standard dictionary is also referred to in modeling the voice recognition engine. Words included in the standard dictionary are more likely to be correctly recognized by the voice recognition engine, but words not included in the standard dictionary or proper nouns are less likely to be correctly recognized by the voice recognition engine.

Therefore, the electronic apparatus selects words, which are expected to have a low probability of correct recognition because they are not included in the standard dictionary, among the obtained words 620, and adds the selected words to the word list 640. Of course, such a method of the filtering 630 is merely an example, and various methods may be used for the filtering 630.

Meanwhile, there may be a limit to the number of words included in the word list 640. The words in the word list 640 may be prioritized based on a predetermined reference. This reference may, for example, include records of frequency of searched words for selecting one among a plurality of pieces of text data, or points in time when words are added to the word list 640. Of course, the reference is not limited to this example.

When (or based on) the number of words included in the word list 640 exceeds a preset number, the electronic apparatus updates the word list 640 by deleting an existing word from the word list 640 based on given priority, and adding a newly obtained word. For example, the electronic apparatus may delete a word from the word list 640 in order from lowest to highest frequency of searches for selecting one among the plurality of pieces of text data, or may delete a word from the word list 640 in order from oldest to newest.

Meanwhile, the foregoing embodiment shows that the recognition result of which recognition suitability is relatively high is identified based on the word list including the confused words. It is understood, however, that one or more other embodiments are not limited thereto. For example, according to another embodiment, instead of receiving the recognition results from the plurality of voice recognition engines, it may be possible to identify the voice recognition engine of which recognition suitability is relatively high and receive the recognition result from the identified voice recognition engine. Such an embodiment is described below.

Figure 7:
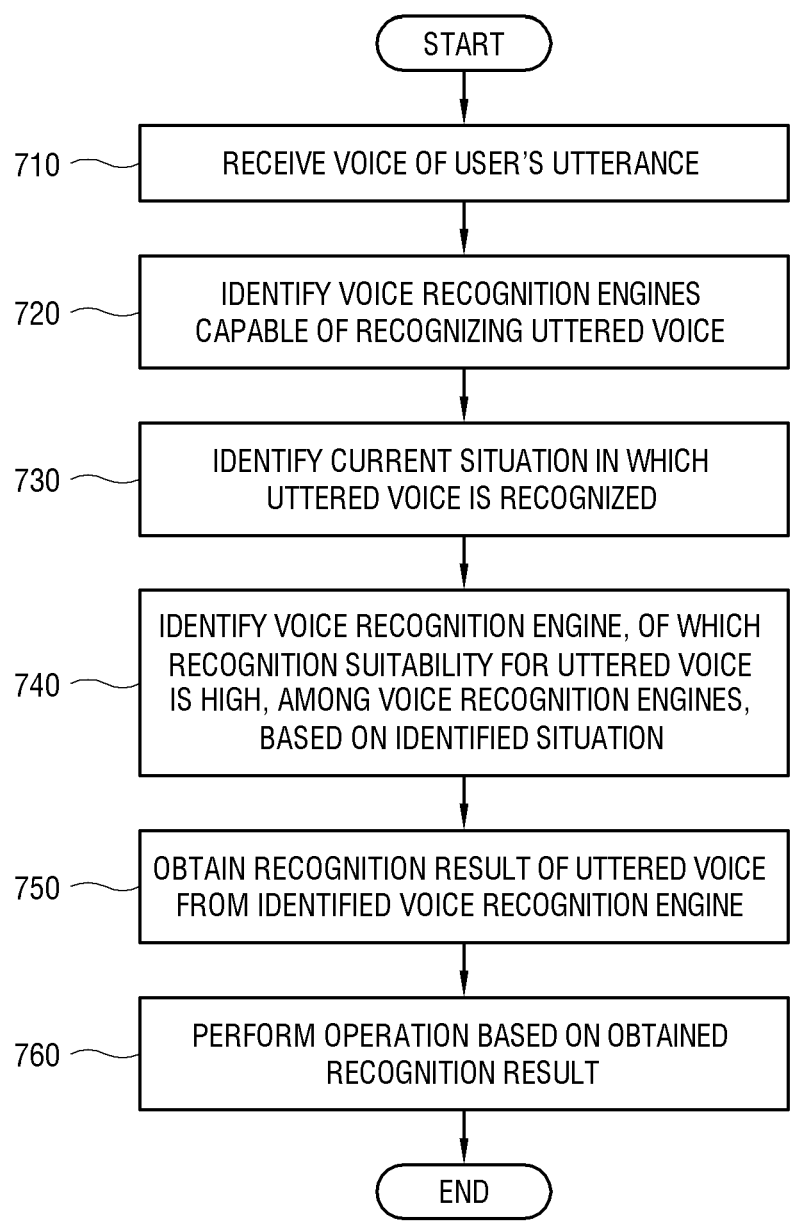
FIG. 7 is a flowchart showing a method of an electronic apparatus to identify a voice recognition engine, which has high recognition suitability, based on a current situation, according to an embodiment.

FIG. 7 is a flowchart showing a method of identifying a voice recognition engine, which has high recognition suitability, based on a current situation.

As shown in FIG. 7, the following operations are performed by the processor of the electronic apparatus.

At operation 710, the electronic apparatus receives a user's utterance-based audio signal.

At operation 720, the electronic apparatus identifies a plurality of voice recognition engines capable of recognizing the utterance-based audio signal.

At operation 730, the electronic apparatus identifies a current situation in which the utterance-based audio signal is recognized.

At operation 740, the electronic apparatus identifies a voice recognition engine, of which recognition suitability for the utterance-based audio signal is high, among the plurality of identified voice recognition engines, based on the identified situation.

At operation 750, the electronic apparatus obtains a recognition result of an uttered voice from the voice recognition engine that is identified to have the relatively high recognition suitability.

At operation 760, the electronic apparatus performs an operation based on the obtained recognition result.

The situation in which the utterance-based audio signal is recognized may be identified based on various pieces of information that can be obtained by the electronic apparatus. Below, an example of the foregoing identification is described.

Figure 8:
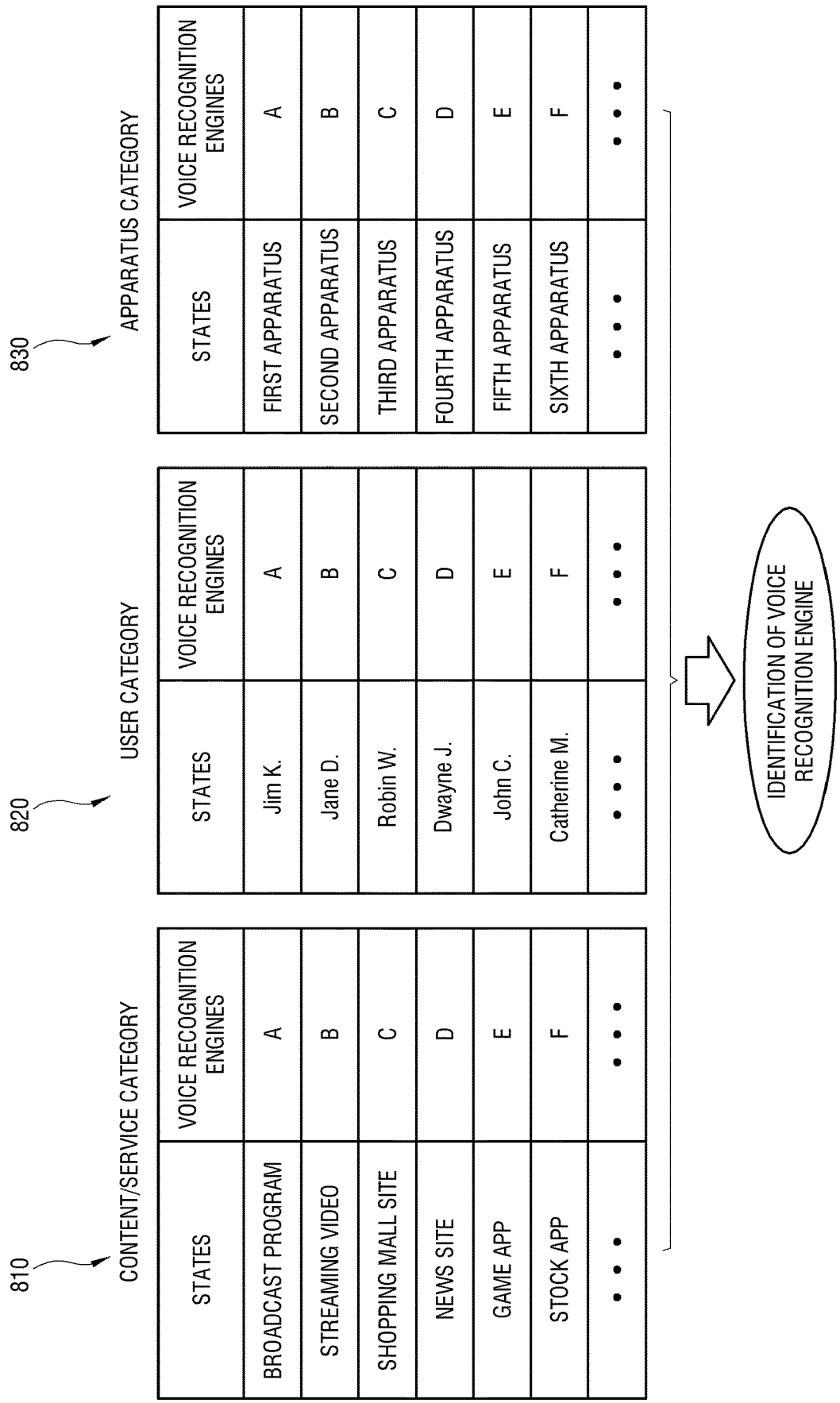
FIG. 8 illustrates a situation in which recognition of an utterance-based audio signal is performed, according to an embodiment.

FIG. 8 illustrates a situation in which recognition of an utterance-based audio signal is performed, according to an embodiment.

As shown in FIG. 8, the electronic apparatus identifies various situations at a current point in time when an utterance-based audio signal is received, and selects a voice recognition engine corresponding to the identified situation. The situations may, for example, be classified into various categories 810, 820 and 830 such as a content/service category 810, a user category 820, an apparatus category 830, etc. The electronic apparatus identifies the voice recognition engine, which has high recognition suitability, based on one among these categories 810, 820 and 830.

The categories 810, 820 and 830 may be provided in the form of a look-up table to define the voice recognition engines corresponding to a plurality of state items. The electronic apparatus identifies the state of one among the categories 810, 820 and 830 corresponding to the current point in time, and identifies that the recognition suitability of the voice recognition engine corresponding to the identified state is relatively high. The electronic apparatus selects one among the plurality of categories 810, 820 and 830 suitable for the current situation, and searches the state corresponding to the current situation within the selected categories 810, 820 and 830.

The content/service category 810 defines the voice recognition engines corresponding to the attributes of the content or service provided by the electronic apparatus. The content may include: multimedia content such as a broadcast program image, streaming video content, an image reproduced based on a stored file, streaming audio content, a sound reproduced based on a stored file, etc.; web sites such as a shopping mall, a news site, etc.; and various applications, etc. The service may include various applications for providing content, web service, operation modes of the electronic apparatus, functions of the electronic apparatus, etc.

For example, it will be assumed that the electronic apparatus identifies a situation that a shopping mall site is displayed on a web browser at a point in time when an utterance-based audio signal is received. In this case, the electronic apparatus identifies a voice recognition engine C corresponding to the shopping mall site within the content/service category 810 related to the content or service. Thus, the electronic apparatus finally selects a recognition result from the voice recognition engine C.

The user category 820 defines the voice recognition engines corresponding to the attributes about personal data such as a name, a gender, a residence, nationality, an age, a job, etc., of a user. When identification is carried out based on a user's name, the electronic apparatus identifies the name of the user based on the account of the user that makes the utterance when an utterance-based audio signal is received. The electronic apparatus identifies the voice recognition engine corresponding to the user identified in the user category 820. For example, when a user's name is identified as "Catherine M.," the electronic apparatus selects a recognition result from the voice recognition engine F.

The apparatus category 830 defines the voice recognition engines corresponding to the attributes about the apparatus information of the electronic apparatus or external apparatuses connected to the electronic apparatus at a point in time when an utterance-based audio signal is received. The apparatus information defined in the apparatus category 830 may include at least one of an apparatus identification (ID), a model name, a brand name, a manufacturer name, etc., of the electronic apparatus, or an apparatus ID, a model name, a brand name, a manufacturer name, etc., of the external apparatus. When identification is carried out based on the external apparatus, the electronic apparatus identifies the apparatus ID of the currently connected external apparatus when an utterance-based audio signal is received. When the apparatus ID is identified as a second apparatus, the electronic apparatus identifies the voice recognition engine B corresponding to the second apparatus within the apparatus category 830. The electronic apparatus selects a recognition result from the voice recognition engine B.

As described above, the electronic apparatus previously defines the voice recognition engines suitable for various situations, and selects the voice recognition engine suitable for the situation at the point of time when the utterance-based audio signal is received.

Typically, a developer that designs the voice recognition engine models the voice recognition engine while focusing on a field that the developer is concerned with. For example, when the developer is concerned with the manufacturer of manufacturing a TV, the developer will design the voice recognition engine while focusing on controlling the operations of the TV. As a result, the designed voice recognition engine is expected to have a high probability of correctly recognizing the utterance relevant to the operations of the TV. Further, when a developer is concerned with a company that runs a shopping mall, the developer will design the voice recognition engine while focusing on purchasing articles in the shopping mall. As a result, the designed voice recognition engine is expected to have a high probability of correctly recognizing the utterance relevant to shopping.

In this regard, the voice recognition result of the voice recognition engine highly relevant to the current situation of the electronic apparatus is more accurate than the voice recognition results of other voice recognition engines. Thus, the electronic apparatus according to an embodiment identifies the voice recognition engine suitable for the situation of the electronic apparatus at a point in time when the utterance-based audio signal is received, and obtains the recognition result from the identified voice recognition engine.

The configuration according to the above-described embodiment identifies the voice recognition engine of which the recognition suitability for the utterance-based audio signal is high, and obtains the recognition result of the identified voice recognition engine. It is understood, however, that such recognition suitability may be applied to not only the configuration of identifying the voice recognition engine to obtain the recognition result, but also a configuration for transmitting an audio signal to one of the plurality of voice recognition engines first. Such an embodiment is described below.

Figure 9:
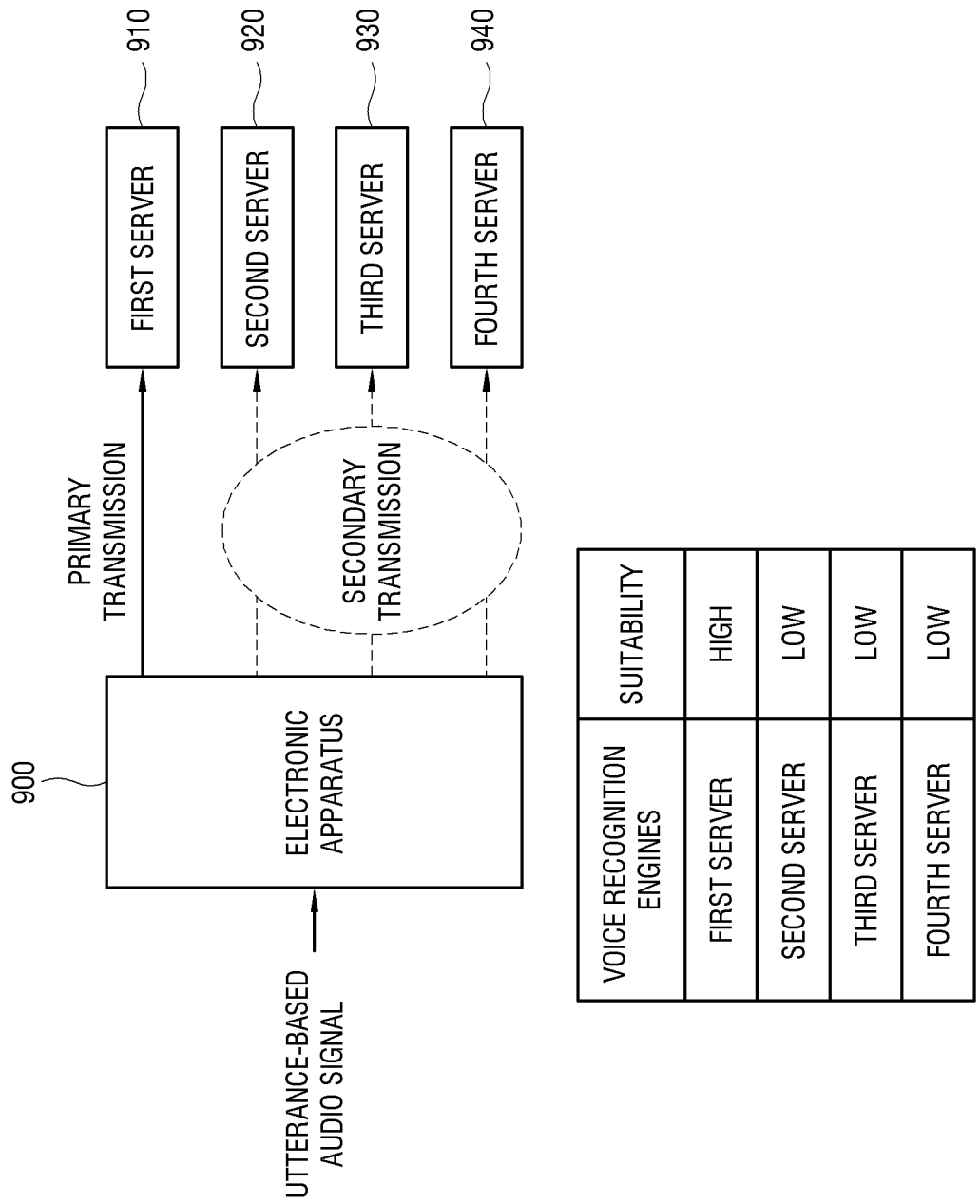
FIG. 9 illustrates an operation of an electronic apparatus transmitting an audio signal to servers in sequence based on recognition suitability, according to an embodiment.

FIG. 9 illustrates an electronic apparatus transmitting an audio signal to servers in sequence based on recognition suitability, according to an embodiment.

As shown in FIG. 9, when an utterance-based audio signal is received, an electronic apparatus 900 identifies whether communication with a plurality of servers 910, 920, 930 and 940 respectively including a plurality of voice recognition engines is possible. The electronic apparatus 900 identifies a voice recognition engine, of which the recognition suitability for the utterance-based audio signal is relatively high, among the voice recognition engines of the plurality of identified servers 910, 920, 930 and 940 with which the communication is possible. The method of identifying the recognition suitability may be the same as or substantially similar to those described above in the foregoing embodiments. Accordingly, redundant descriptions thereof may be omitted below.

In the present example, it is assumed that there are first, second, third and fourth servers 910, 920, 930 and 940 capable of communicating with the electronic apparatus 900 and respectively including voice recognition engines. The electronic apparatus 900 identifies the recognition suitability of each voice recognition engine of these four servers 910, 920, 930 and 940 with respect to the utterance-based audio signal. For example, the recognition suitability of the voice recognition engine in the first server 910 may be higher or greater than those of the voice recognition engines in the second server 920, the third server 930 and the fourth server 940. In this case, the electronic apparatus 900 transmits the audio signal to the first server 910 first, among the plurality of servers 910, 920, 930 and 940, so that a recognition process can be performed by the voice recognition engine of the first server 910 first. After transmitting the audio signal to the first server 910, the electronic apparatus 900 transmits the audio signal to the second, third and fourth servers 920, 930 and 940.

The electronic apparatus 900 preferentially transmits the utterance-based audio signal to the first server 910 including the voice recognition engine having higher recognition suitability first for at least the following reason. The electronic apparatus 900 may transmit the audio signal to the plurality of servers 910, 920, 930 and 940 and receive text data as recognition results of the audio signal from the servers 910, 920, 930 and 940. In this case, severe network traffic may be caused by communication conditions between the electronic apparatus 900 and the plurality of servers 910, 920, 930 and 940. With respect to network communication, when data transmission and reception between the electronic apparatus 900 and the servers 910, 920, 930 and 940 are excessively delayed, the data transmission and reception may be not normally performed but terminated. This termination may remarkably occur in the servers 910, 920, 930 and 940 to which the audio signal is transmitted later.

Therefore, the electronic apparatus 900 according to the present embodiment preferentially transmits the audio signal to the first server 910 including the voice recognition engine having higher recognition suitability, thereby stably obtaining a more accurate recognition result.

Alternatively, in consideration of network traffic, the electronic apparatus 900 may distinguish between the voice recognition engine to be used in recognition and the voice recognition engine not to be used in recognition among the plurality of voice recognition engines. Such an embodiment is described below.

Figure 10:
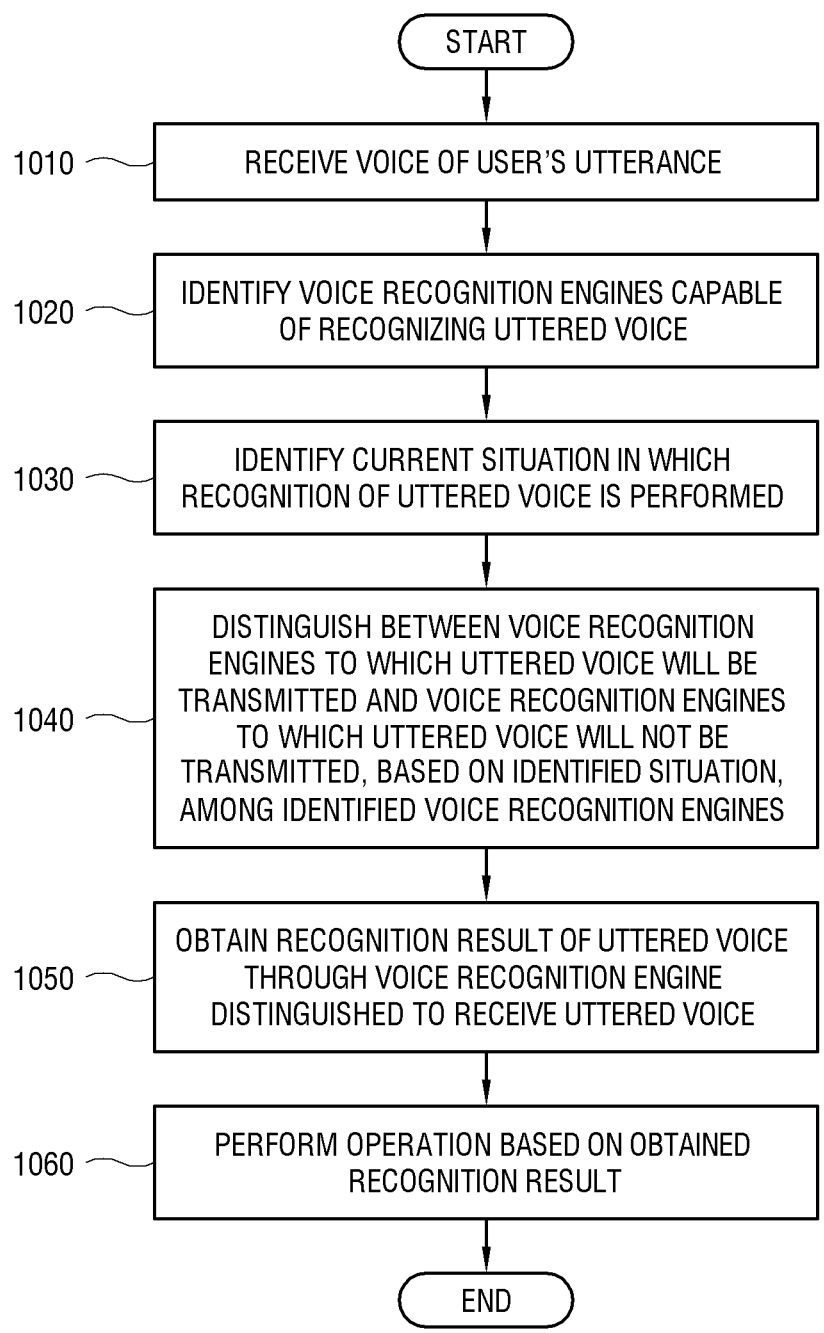
FIG. 10 is a flowchart showing a method of an electronic apparatus to identify a voice recognition engine to which an utterance-based audio signal will be transmitted, according to an embodiment.

FIG. 10 is a flowchart showing a method of identifying a voice recognition engine to which an utterance-based audio signal will be transmitted, according to an embodiment.

As shown in FIG. 10, the following operations are performed by the processor of the electronic apparatus.

At operation 1010, the electronic apparatus receives a user's utterance-based audio signal.

At operation 1020, the electronic apparatus identifies a plurality of voice recognition engines capable of recognizing the utterance-based audio signal.

At operation 1030, the electronic apparatus identifies (or determines) a current situation in which recognition of the utterance-based audio signal is performed.

At operation 1040, the electronic apparatus distinguishes between one or more voice recognition engines to which the utterance-based audio signal will be transmitted and one or more voice recognition engines to which the utterance-based audio signal will not be transmitted, based on the identified situation, among the plurality of identified voice recognition engines. To this end, the electronic apparatus may distinguish between the voice recognition engine to be used in the recognition and the voice recognition engine not to be used in the recognition, based on one or more references (or information). The one or more references may include at least one of information about a user who utters a sound, information about an electronic apparatus, attributes of content or service, etc. In other words, as described above, the electronic apparatus may identify various situations (or attributes, characteristics, etc.) at a current point in time when the utterance-based audio signal is received, and distinguish between the voice recognition engine to be used in the recognition and the voice recognition engine not to be used in the recognition based on the identified situation.

At operation 1050, the electronic apparatus obtains a recognition result of an uttered voice through the voice recognition engine distinguished to receive the utterance-based audio signal.

At operation 1060, the electronic apparatus performs an operation based on the obtained recognition result.

For example, when the electronic apparatus receives an utterance-based audio signal while displaying an image of a shopping mall among broadcast programs, the electronic apparatus may transmit the audio signal to one or more voice recognition engines specialized for play control of a broadcast program, a shopping mall, etc., among various voice recognition engines, but may not transmit the audio signal to the other voice recognition engines.

Meanwhile, as described above, the word list may include confused words selected from various sources. For example, the confused words may be obtained from records of previous voice recognition failures. Such an embodiment is described below.

Figure 11:
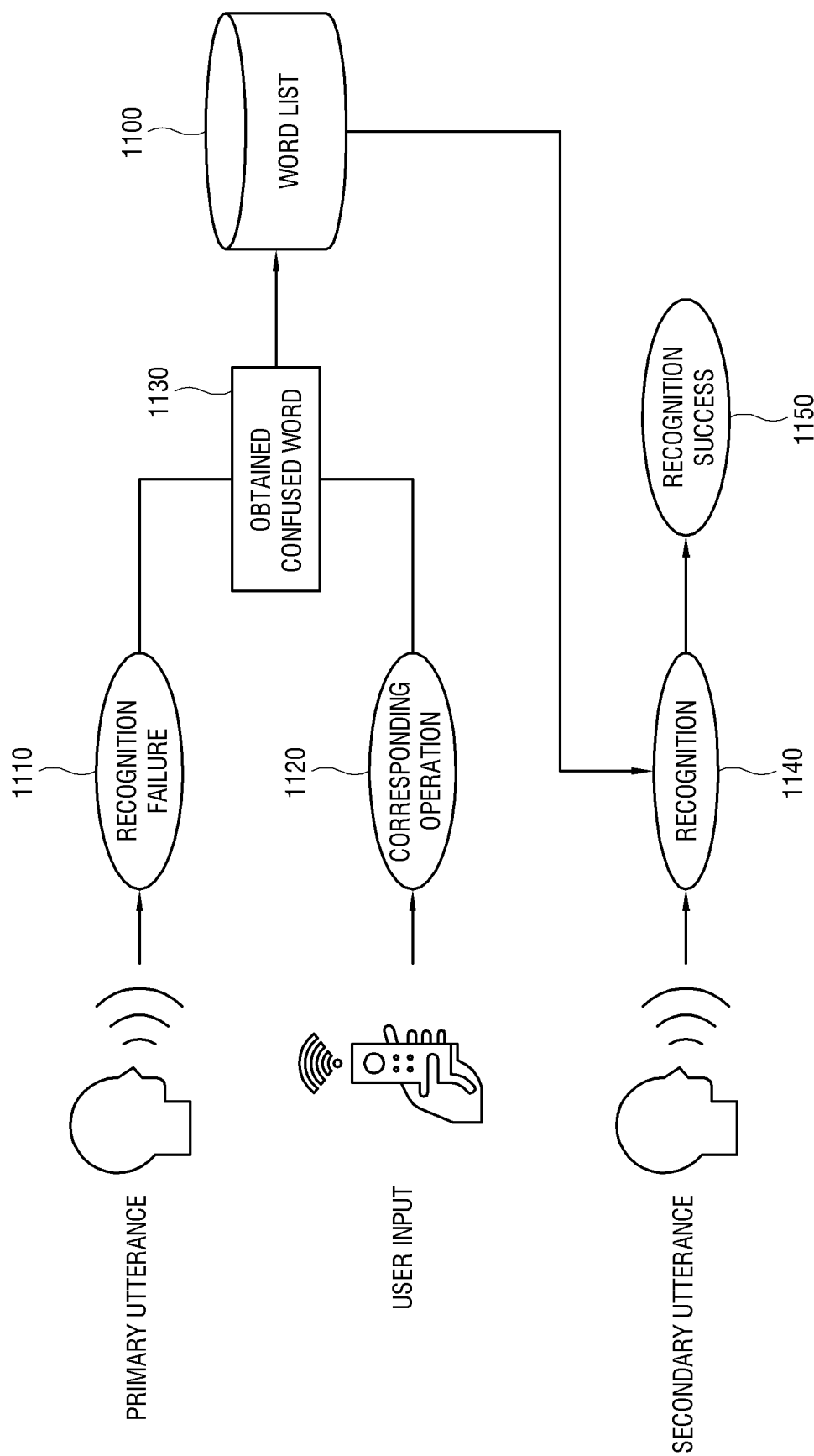
FIG. 11 illustrates a principle of an electronic apparatus obtaining a confused word from records of voice recognition failure, according to an embodiment.

FIG. 11 illustrates a principle of an electronic apparatus obtaining a confused word from records of voice recognition failure, according to an embodiment.

As shown in FIG. 11, the electronic apparatus receives a primary utterance-based audio signal from a user. At operation 1110, the electronic apparatus may fail in obtaining a normal recognition result of the primary utterance-based audio signal. When an operation based on a result of utterance is not carried out, a user directly controls an operation based on the result through other inputs (e.g., a button input on a remote controller, a touch input on a touch screen, a gesture input, a different voice utterance input, etc.) besides the utterance. In other words, a user input, which is received within a predetermined period of time from when the voice recognition of the utterance is failed, is highly likely to have a high relationship with the recognition result of the utterance When (or based on) a user input is received within a predetermined period of time from when the recognition result of the primary utterance-based audio signal is a failure, the electronic apparatus performs an operation based on the user input at operation 1120.

At operation 1130, the electronic apparatus obtains one or more confused words by analyzing a relationship between the failed recognition result of the primary uttered voice and the corresponding operation of the user input, and adds the obtained one or more confused words to a word list 1100.

For example, when the primary uttered voice contains a command to display a specific broadcast program, it may be successfully recognized in the recognition result of the primary uttered voice that the primary uttered voice contains the command to display something in operation 1110, but the electronic device may fail to recognize what it is to be displayed. When the corresponding operation for displaying a specific broadcast program is performed at operation 1120, a partial voice, the recognition of which fails in the operation 1110, may be expected (or determined) to indicate the broadcast program to be displayed in the operation 1120. The electronic apparatus obtains a title of a corresponding broadcast program from EPG data, and adds the obtained title to the word list 1100.

The relationship between the failed recognition result of the primary uttered voice and the corresponding operation of the user input may be analyzed by various methods or algorithms, for example, AI-based algorithms of machine learning and deep learning fields.

Then, the electronic apparatus may receive a secondary (or subsequent) utterance-based audio signal of the same content as the primary utterance-based audio signal. At operation 1140, the electronic apparatus recognizes the secondary utterance-based audio signal with reference to the word list 1100. Because the word list 1100 includes the confused words based on the failed recognition result of the primary utterance-based audio signal, the electronic apparatus successfully processes the recognition with reference to the confused words of the word list 1100 at operation 1150.

While, according to the present embodiment, the voice recognition is performed by the electronic apparatus, it is understood that one or more other embodiments are not limited thereto. For example, according to another embodiment, the voice recognition may be performed in the server.

Meanwhile, the above-described embodiments are related to fields of recognizing a user's utterance. However, there may be various methods of inputting a user's command, and a method among them may implement a recognition algorithm. In other words, the concept of the disclosure is not simply limited to only the utterance, but may be applied to any configuration of implementing the recognition process among user input methods. Such an embodiment is described below.

Figure 12:
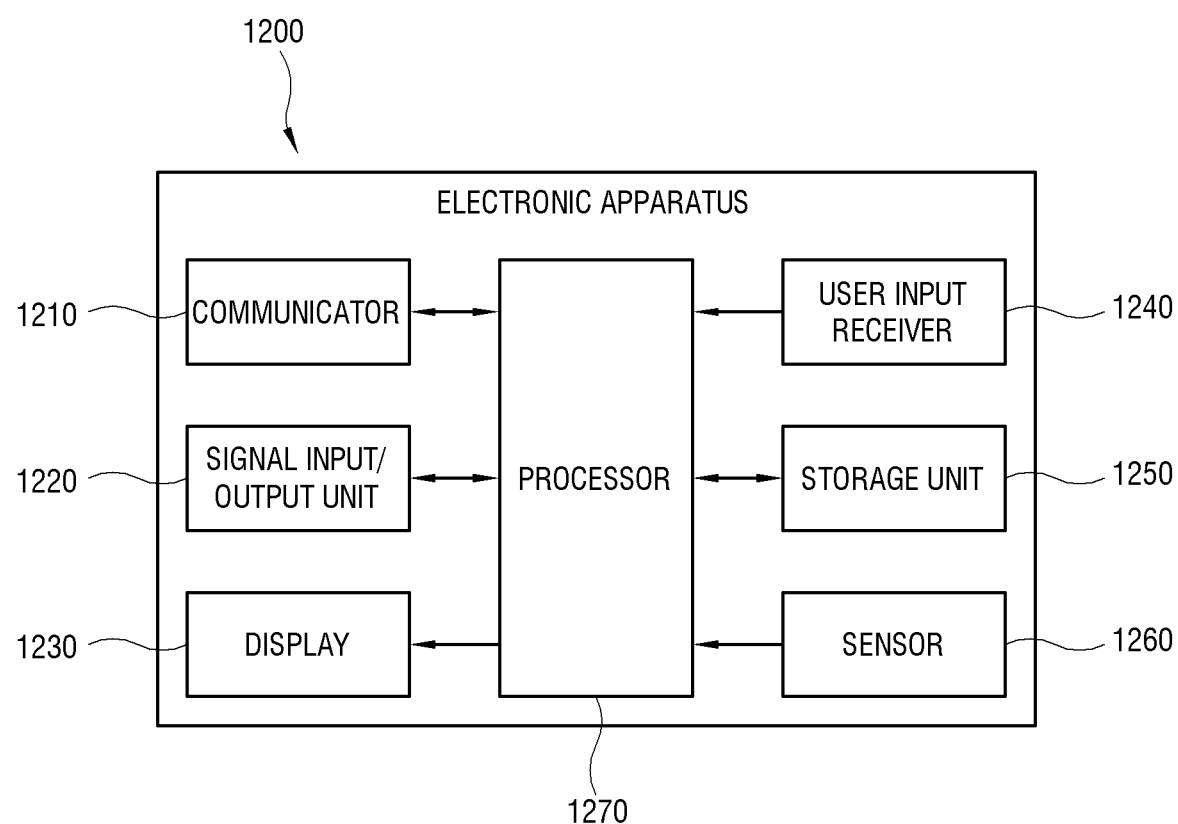
FIG. 12 is a block diagram of an electronic apparatus according to an embodiment.

FIG. 12 is a block diagram of an electronic apparatus 1200 according to an embodiment.

As shown in FIG. 12, an electronic apparatus 1200 includes a communicator 1210, a signal input/output unit 1220 (or signal inputter/outputter), a display 1230, a user input receiver 1240, a storage unit 1250 (or storage), a sensor 1260, and a processor 1270. Other than the sensor 1260, these elements may be the same as or substantially similar to those of the above-described embodiments, and thus redundant descriptions thereof may be omitted below.

The sensor 1260 includes a camera for detecting a user's gesture. The sensor 1260 is configured to capture a user's gesture performed for a predetermined period of time, and transmit the captured image to the processor 1270. According to the present embodiment, the electronic apparatus 1200 includes the sensor 1260 for detecting a user's gesture. It is understood, however, that a method that the processor 1270 uses to obtain an image by capturing a user's gesture is not limited thereto. For example, the electronic apparatus 1200 may be connected to an external apparatus including a camera through the communicator 1210 or the signal input/output unit 1220, and may obtain a corresponding image from the external apparatus.

The storage unit 1250 is configured to store a list of operation commands corresponding to a user's various gestures.

The processor 1270 identifies a user's gesture by analyzing an image captured by the sensor 1260, retrieves a command corresponding to the identified gesture from the list stored in the storage unit 1250, and performs an operation corresponding to the retrieved command. For example, the list may include a channel switching command designated corresponding to a user's motion of moving one hand from left to right. When a user's gesture in the captured image is identified as a motion of one hand moving from left to right, the processor 1270 identifies the channel switching command based on the list and switches a channel upon the identified channel switching command.

The electronic apparatus 1200 according to the present embodiment performs an image analysis process of analyzing the captured image and identifying a user's gesture. It is understood, however, that one or more other embodiments are not limited thereto. For example, according to another embodiment, a separate server or external apparatus may perform the image analysis process and provide a process result to the electronic apparatus 1200.

Meanwhile, the identification result of the gesture may vary according to models, algorithms, AI, etc., used in the image analysis process. In this regard, the gesture may be identified by the following operations.

Figure 13:
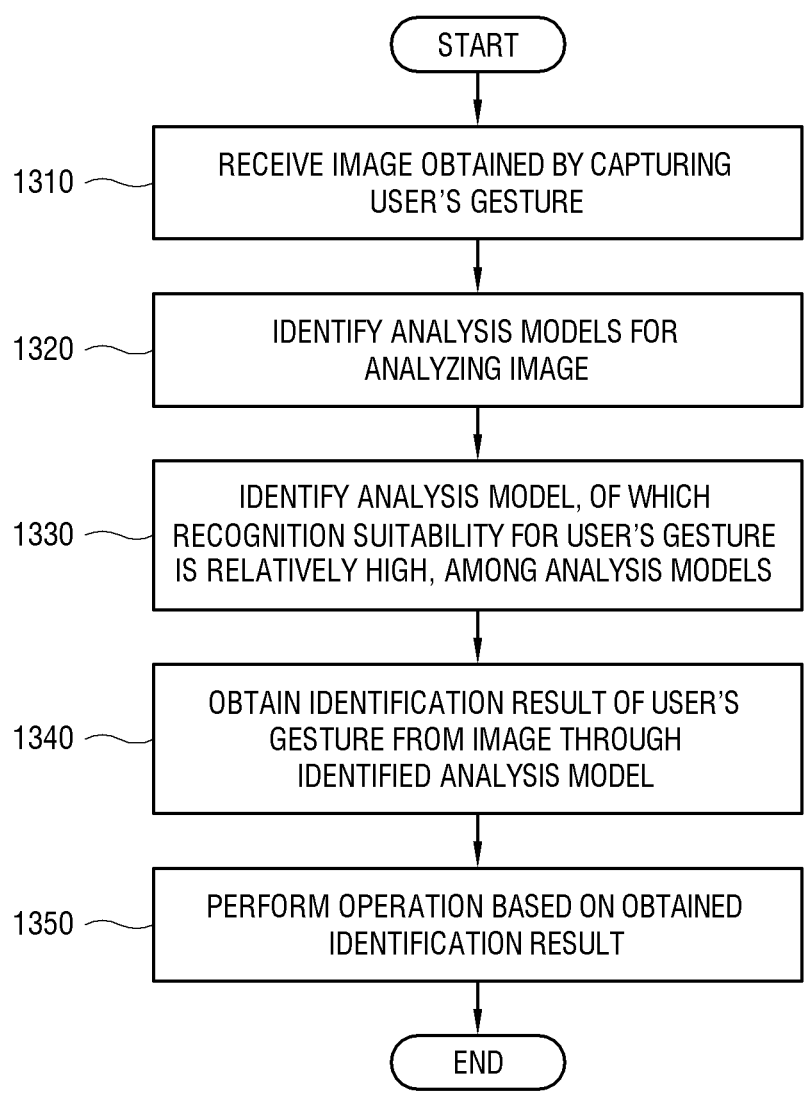
FIG. 13 is a flowchart showing a method of an electronic apparatus to obtain a recognition result of a user's gesture, according to an embodiment.

FIG. 13 is a flowchart showing a method of obtaining a recognition result of a user's gesture, according to an embodiment.

As shown in FIG. 13, the following operations are performed by the processor of the electronic apparatus.

At operation 1310, the electronic apparatus receives an image obtained by capturing a user's gesture.

At operation 1320, the electronic apparatus identifies a plurality of analysis models for analyzing the received image. Each analysis model is provided to individually analyze the image and identify the user's gesture.

At operation 1330, the electronic apparatus identifies an analysis model, of which recognition suitability for the user's gesture is relatively high, among the plurality of analysis models.

At operation 1340, the electronic apparatus obtains an identification result of the user's gesture from the image through the analysis model identified to have the relatively high recognition suitability.

At operation 1350, the electronic apparatus performs an operation based on the obtained identification result.

Accordingly, the electronic apparatus selects an analysis model, of which recognition suitability for a user's gesture is high, among the plurality of analysis models, so that the gesture can be more correctly recognized. The recognition suitability for the user's gesture is equivalent to the recognition suitability for the user's utterance voice in the above-described embodiments.

Meanwhile, the electronic apparatus may use any of plural methods to obtain a voice of a user's utterance, as described below.

Figure 14:
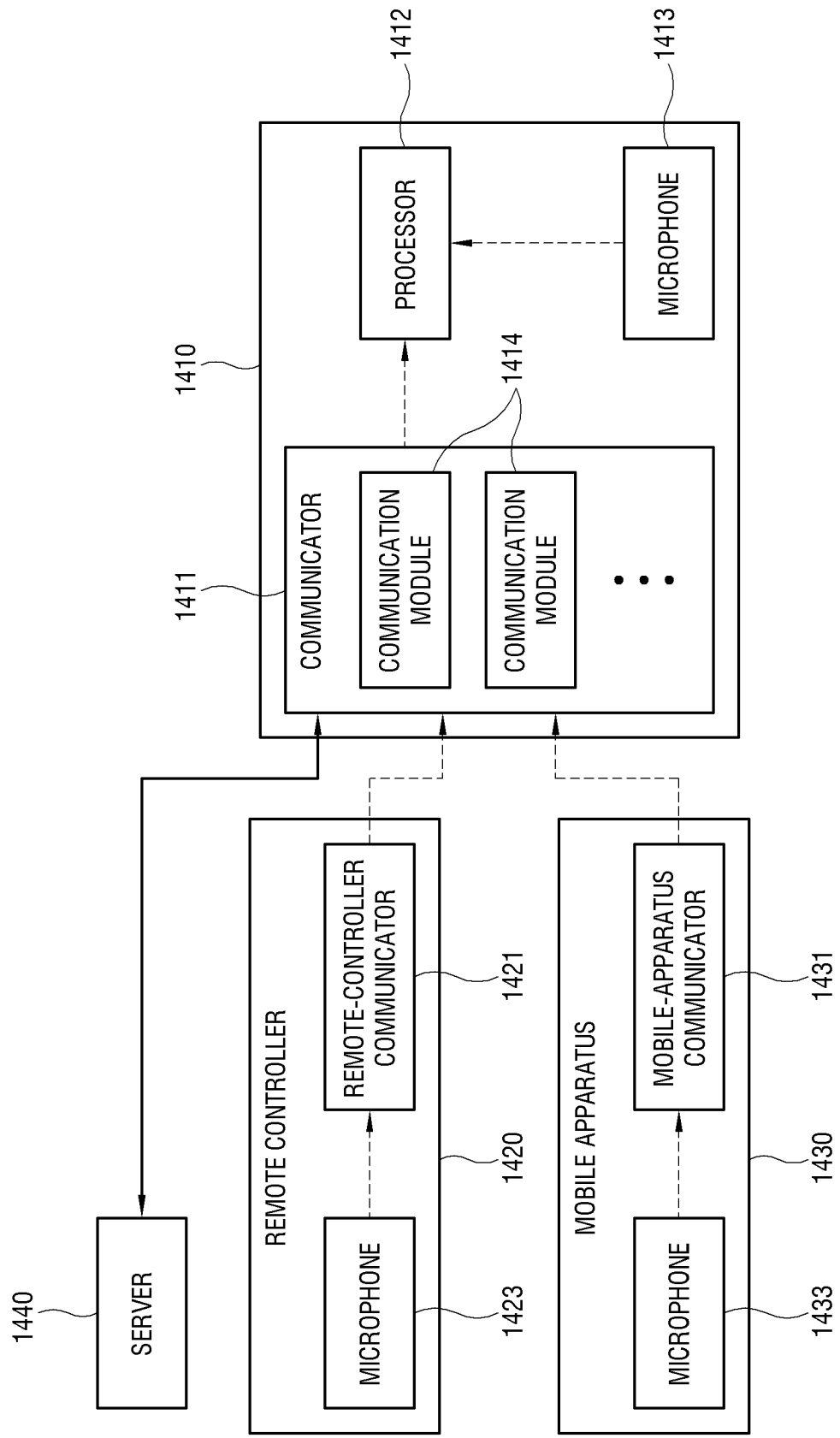
FIG. 14 is a block diagram of an electronic apparatus and various input apparatuses, according to an embodiment.

FIG. 14 is a block diagram of an electronic apparatus 1410 and various input apparatuses, according to one or more embodiments.

As shown in FIG. 14, an electronic apparatus 1410 includes a communicator 1411 and a processor 1412 (e.g., at least processor). The communicator 1411 may include a plurality of communication modules 1414 according to supportable communication protocols. For example, the plurality of communication modules 1414 includes an Ethernet modem, a Wi-Fi communication chip, a Bluetooth communication chip, an infrared receiving module, etc., and each communication module 1414 is provided to perform communication based on support protocols.

The electronic apparatus 1410 can communicate with various external apparatuses 1420 and 1430 or a server 1440 through the communicator 1411. The communication module 1414 used for the external apparatuses 1420 and 1430 to communicate with the electronic apparatus 1410 may be the same as that for the server 1440. For example, the electronic apparatus 1410 may use the Wi-Fi communication chip as the communication module 1414 to perform Wi-Fi based wireless communication with both the server 1440 and the external apparatus 1420 and 1430. Alternatively, the electronic apparatus 1410 may use different communication modules 1414 to respectively communicate with the external apparatus 1420 and 1430 and the server 1440. For example, the electronic apparatus 1410 may use the Ethernet modem as the communication module 1414 to communicate with the server 1440, but may use the Bluetooth communication chip as the communication module 1414 to communicate with the external apparatuses 1420 and 1430.

The external apparatuses 1420 and 1430 may include a dedicated apparatus related to the electronic apparatus 1410, and/or may include a general-purpose apparatus provided to communicate with the electronic apparatus 1410 although not manufactured in relation to the electronic apparatus

1410. For example, the dedicated apparatus may be a remote controller 1420 provided to control the electronic apparatus 1410, and the general-purpose apparatus may be a mobile apparatus 1430.

The electronic apparatus 1410 may obtain a user's utterance voice as follows.

The electronic apparatus 1410 may include a microphone 1413 configured to collect or capture sounds. An audio signal based on a user's utterance is collected through the microphone 1413, converted into a digital signal, and transmitted to the processor 1412. The processor 1412 processes the received utterance-based audio signal. Here, a detailed processing method is the same as or similar to those described above, and thus redundant descriptions thereof may be omitted below.

Alternatively, when the remote controller 1420 includes a microphone 1423, the electronic apparatus 1410 may receive an audio signal of a user's utterance collected through the microphone 1423 from the remote controller 1420. The remote controller 1420 converts the audio signal of the user's utterance collected through the microphone 1423 into a digital signal, and transmits the digital signal to the communication module 1414 through a remote-controller communicator 1421 based on a protocol supported in the communication module 1414.

Alternatively, in a case of a mobile apparatus 1430 and the like general-purpose apparatus, the mobile apparatus 1430 may operate like the remote controller 1420 by installing and executing an application program provided for controlling the electronic apparatus 1410. The mobile apparatus 1430 converts the audio signal of the user's utterance, which is collected through a microphone 1433 while the application program is running, into a digital signal, and transmits the digital signal to the communication module 1414 through a mobile-apparatus communicator 1431.

Accordingly, the electronic apparatus 1410 can obtain a user's utterance voice through various methods.

Meanwhile, the electronic apparatus may also be designed to use a method of identifying a voice recognition engine, of which recognition suitability for the utterance voice is high (e.g., highest, or greater than a predetermined metric or threshold value), among the plurality of voice recognition engines, and obtaining the recognition result of the identified voice recognition engine. Such an embodiment is described below.

Figure 15:
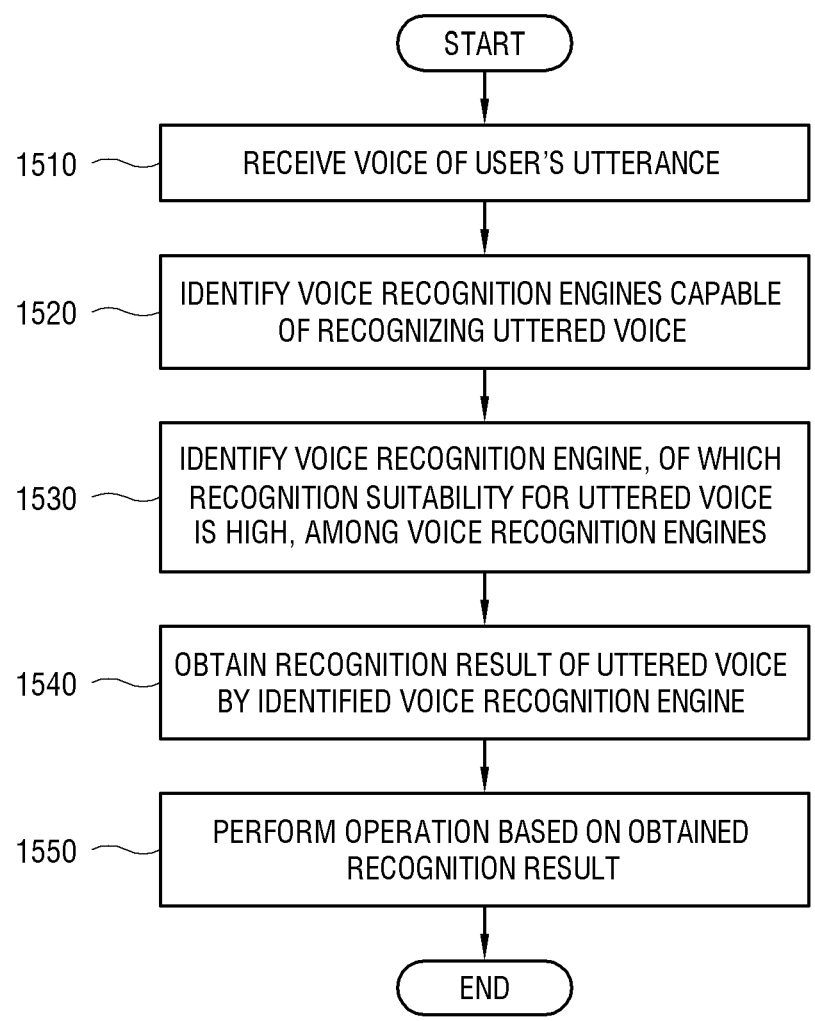
FIG. 15 is a flowchart showing a method of controlling an electronic apparatus, according to an embodiment.

FIG. 15 is a flowchart showing a method of controlling an electronic apparatus according to an embodiment.

As shown in FIG. 15, the following operations are performed by the processor of the electronic apparatus.

At operation 1510, the electronic apparatus receives a user's utterance voice.

At operation 1520, the electronic apparatus identifies a plurality of voice recognition engines capable of recognizing the uttered voice.

At operation 1530, the electronic apparatus identifies a voice recognition engine, of which the recognition suitability for the uttered voice is high (e.g., highest), among the plurality of identified voice recognition engines.

At operation 1540, the electronic apparatus obtains a recognition result of the uttered voice by the voice recognition engine identified to have the highest recognition suitability.

At operation 1550, the electronic apparatus performs an operation based on the recognition result.

Accordingly, the electronic apparatus selects a voice recognition engine, of which the recognition suitability for the uttered voice is high, among the plurality of voice recognition engines, so that the voice recognition operation can be more correctly performed.

The operations of the apparatus according to the above-described embodiments may be performed by artificial intelligence provided in the corresponding apparatus. The artificial intelligence may be applied to various general systems by utilizing a machine learning algorithm. An artificial intelligence system refers to a computer system with intelligence of a human or being second to a human. In such a system, a machine, an apparatus or a system autonomously performs learning and identifying and is improved in accuracy of recognition and identification based on accumulated experiences. The artificial intelligence is based on elementary technology by utilizing machine learning (deep-learning) technology and algorithms based on an algorithm of autonomously classifying and learning features of input data, and copying perception, identification and the like functions of a human brain.

The elementary technology may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Here, linguistic comprehension refers to technology of recognizing, applying and processing a human's language or text, and includes natural language processing, machine translation, conversation system, question and answer, voice recognition and synthesis, etc.

Inference and prediction refer to technology of identifying information and logically making prediction, and includes knowledge- and probability-based inference, optimized prediction, preference-based plan, recommendation, etc.

Knowledge representation refers to technology of automating a human's experience information into knowledge data, and includes knowledge building such as data creation and classification, knowledge management such as data utilization, etc.

The methods according to the foregoing embodiments may be achieved in the form of a program instruction that can be implemented in various computers, and recorded in a computer-readable medium. Such a computer-readable medium may include a program instruction, a data file, a data structure or the like, or combinations thereof. For example, the computer readable medium may be stored in a nonvolatile storage such as universal serial bus (USB) memory, regardless of whether it is deletable or rewritable, for example, a RAM, a ROM, a flash memory, a memory chip, an integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program instruction recorded in this storage medium may be specially designed and configured according to the embodiments, or may be publicly known and available to those skilled in the art of computer software. Further, the computer program instruction may be implemented by a computer program product.

Although a few embodiments have been shown and described above, it will be appreciated by those skilled in the art that changes may be made in these embodiments without departing from the principles and spirit of the invention, the scope of which is defined at least in part in the appended claims and their equivalents.

What is claimed is:

1. An electronic apparatus comprising:
at least one processor configured to:
receive a user voice input;
obtain, from a plurality of voice recognizers capable of recognizing the user voice input, a plurality of recognition results of the received user voice input;
based on a percentage of the same content among the plurality of recognition results being greater than a threshold, obtain a recognition result of the plurality of recognition results without using a word list, the word list including words previously registered;
based on the percentage not being greater than the threshold, obtain a recognition result of the plurality of recognition results, using the word list; and
perform an operation based on the obtained recognition result.

2. The electronic apparatus according to claim 1, wherein the word list comprises at least one of a word not included in a previously-registered dictionary, a proper noun, or a word of which recognition failed in a previous recognition result.

3. The electronic apparatus according to claim 1, wherein the at least one processor is further configured to identify a voice recognizer, among the plurality of voice recognizers, based on a characteristic of a situation in which the user voice input is captured, and to obtain the recognition result from the identified voice recognizer.

4. The electronic apparatus according to claim 1, wherein:
the user voice input is captured while the electronic apparatus is providing content or a service; and
the at least one processor is further configured to obtain the recognition result, which is related to the provided content or service, among the plurality of recognition results.

5. The electronic apparatus according to claim 1, wherein the at least one processor is further configured to obtain the recognition result, which is related to the user who provides the user voice input, among the plurality of recognition results.

6. The electronic apparatus according to claim 1, wherein the at least one processor is further configured to obtain the recognition result, which is related to an external apparatus connectable to the electronic apparatus, among the plurality of recognition results.

7. The electronic apparatus according to claim 1, further comprising:
a communicator configured to communicate with a plurality of servers respectively comprising the plurality of voice recognizers,
wherein the at least one processor is further configured to control to transmit, via the communicator, the received user voice input to a voice recognizer of which a recognition suitability is identified to be high, among the plurality of voice recognizers, before transmitting the received user voice input to other voice recognizers among the plurality of voice recognizers.

8. A method of controlling an electronic apparatus, the method comprising:
receiving a user voice input;
obtaining a word list including word previously registered;
obtaining, from a plurality of voice recognizers capable of recognizing the user voice input, a plurality of recognition results of the received user voice input;
based on a percentage of the same content among the plurality of recognition results being greater than a threshold, obtain a recognition result of the plurality of recognition results without using the word list;
based on the percentage not being greater than the threshold, obtaining a recognition result of the plurality of recognition results, using the word list; and
performing an operation based on the obtained recognition result.

9. The method according to claim 8, wherein the word list comprises at least one of a word not included in a previously-registered dictionary, a proper noun, or a word of which recognition failed in a previous recognition result.

10. The method according to claim 8, further comprising identifying a voice recognizer, among the plurality of voice recognizers, based on a characteristic of a situation in which the user voice input is captured, and obtaining the recognition result from the identified voice recognizer.

11. The method according to claim 8, wherein:
the voice input is captured while the electronic apparatus is providing content or a service; and
the method further comprises obtaining the recognition result, which is related to the provided content or service, among the plurality of recognition results.

12. The method according to claim 8, further comprising obtaining the recognition result, which is related to the user who provides the user voice input, among the plurality of recognition results.

13. The method according to claim 8, further comprising obtaining the recognition result, which is related to an external apparatus connectable to the electronic apparatus, among the plurality of recognition results.

14. The method according to claim 8, wherein:
the plurality of voice recognizers is respectively provided in a plurality of servers; and
the method further comprises transmitting the received user voice input to a voice recognizer of which a recognition suitability is identified to be high, among the plurality of voice recognizers, before transmitting the received user voice input to other voice recognizers among the plurality of voice recognizers.

15. A non-transitory computer-readable recording medium having recorded thereon instructions executable by at least one processor to perform the method of claim 10.

* * * * *